(12) United States Patent
Fuks et al.

(10) Patent No.: US 12,079,710 B2
(45) Date of Patent: Sep. 3, 2024

(54) SCALABLE NEURAL NETWORK ACCELERATOR ARCHITECTURE

(71) Applicant: NXP USA, Inc., Austin, TX (US)

(72) Inventors: Adam Fuks, Sunnyvale, CA (US); Paul Kimelman, Alamo, CA (US); Franciscus Petrus Widdershoven, Eindhoven (NL); Brian Christopher Kahne, Austin, TX (US); Xiaomin Lu, Austin, TX (US)

(73) Assignee: NXP USA, Inc., Austin, TX (US)

( * ) Notice: Subject to any disclaimer, the term of this patent is extended or adjusted under 35 U.S.C. 154(b) by 867 days.

(21) Appl. No.: 17/139,318

(22) Filed: Dec. 31, 2020

(65) Prior Publication Data
US 2022/0207332 A1    Jun. 30, 2022

(51) Int. Cl.
*G06N 3/063*    (2023.01)
*G06N 3/08*    (2023.01)

(52) U.S. Cl.
CPC ............... *G06N 3/063* (2013.01); *G06N 3/08* (2013.01)

(58) Field of Classification Search
CPC .......... G06N 3/063; G06N 3/08; G06N 3/045; G06N 3/048; G06F 9/30109; G06F 9/3887
See application file for complete search history.

(56) References Cited

U.S. PATENT DOCUMENTS

| | | | |
|---|---|---|---|
| 9,697,463 B2 | 7/2017 | Ross et al. | |
| 9,747,548 B2 | 8/2017 | Ross et al. | |
| 9,928,460 B1 | 3/2018 | Nowatzyk et al. | |
| 2019/0079801 A1 | 3/2019 | Lyuh et al. | |
| 2019/0311243 A1 | 10/2019 | Whatmough et al. | |
| 2020/0175355 A1* | 6/2020 | Chung | G06F 15/8046 |
| 2021/0012186 A1* | 1/2021 | Venkatesh | G06N 3/063 |

FOREIGN PATENT DOCUMENTS

| | | |
|---|---|---|
| WO | WO-2018/005030 A1 | 1/2018 |
| WO | WO-2019/193317 A1 | 10/2019 |

\* cited by examiner

*Primary Examiner* — Pei Yong Weng

(57) ABSTRACT

A scalable neural network accelerator may include a first circuit for selecting a sub array of an array of registers, wherein the sub array comprises LH rows of registers and LW columns of registers, and wherein LH and RH are integers. The accelerator may also include a register for storing a value that determines LH. In addition, the accelerator may include a first load circuit for loading data received from the memory bus into registers of the sub array.

19 Claims, 20 Drawing Sheets

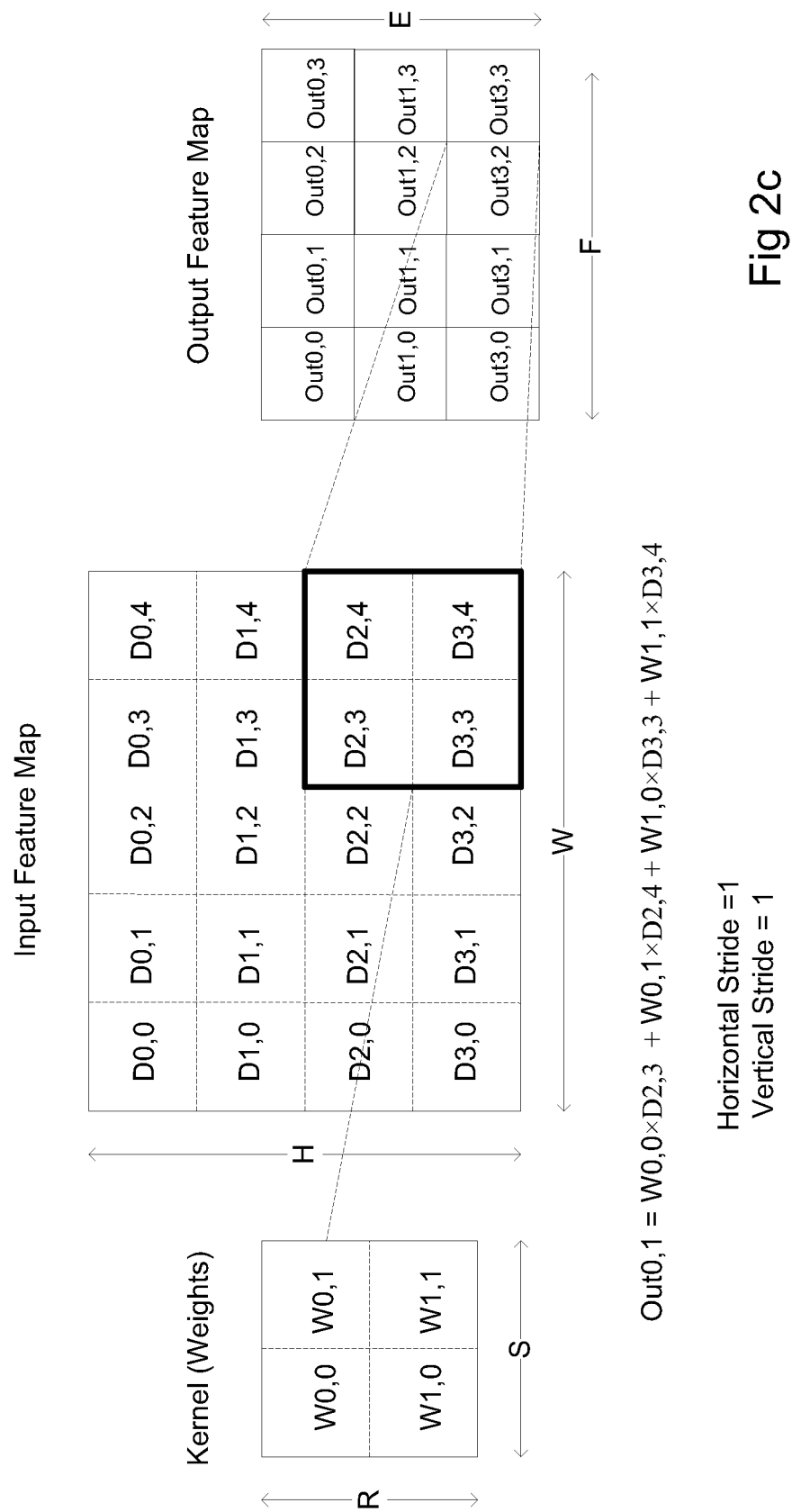

SCALABLE NEURAL NETWORK ACCELERATOR ARCHITECTURE

BACKGROUND

Neural networks (NNs) are used in many artificial intelligence (AI) applications such as image recognition, natural language processing, etc. In general NNs extract high-level features from raw sensory data. The extractions, however, comes at a cost of high computational complexity. General-purpose compute engines, especially graphics processing units (GPUs), have been used for much NN processing. However, GPUs are limited in their processing power ability, and cannot keep up with the increasing computational demands of NN processing. Dedicated NN accelerators provide relatively faster performance.

BRIEF DESCRIPTION OF THE DRAWINGS

The present technology may be better understood, and its numerous objects, features, and advantages made apparent to those skilled in the art by referencing the accompanying drawings.

FIGS. 2a-2c illustrates operational aspects of an example two-dimensional convolution within a neural network.

FIG. 8b-8g illustrate operational aspects of the example compute block and register array shown in FIG. 8a.

The use of the same reference symbols in different drawings indicates similar or identical items.

DETAILED DESCRIPTION

Figure 1:
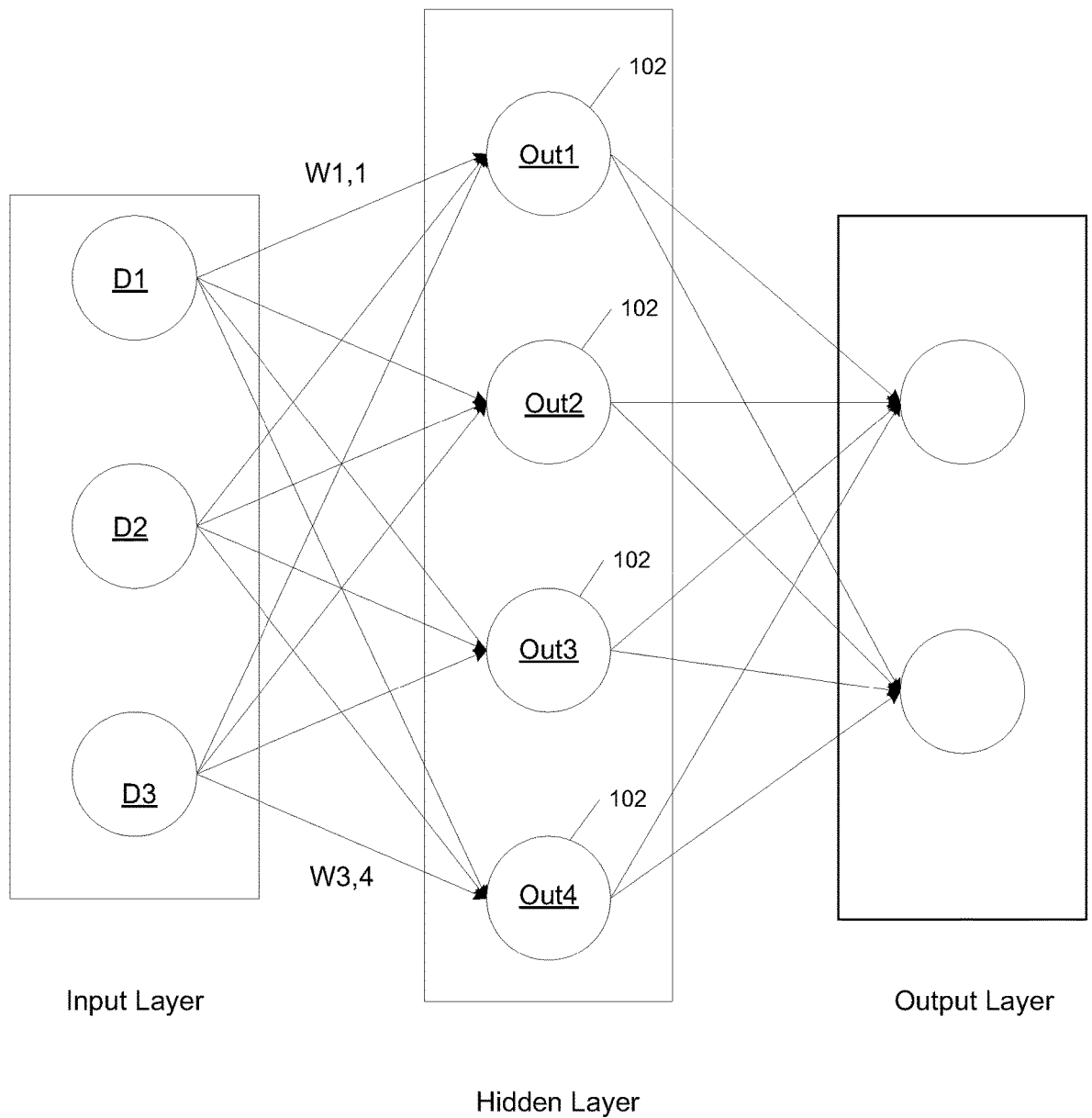
FIG. 1 illustrates relevant aspects of an example fully-connected neural network.

The subject matter described in this specification relates to a method and apparatus for NN computations. NNs are inspired by the belief that computation of a neuron's output signal involves a weighted sum of input signals. FIG. 1 illustrates relevant aspects of one type of NN called a fully-connected NN. A layer of nodes receive data inputs Di and propagates them to compute nodes 102 in a middle layer (i.e., a "hidden layer"). Each node 102 computes an output Outi=f($\Sigma$Wij×Di+bi), where Wij are neural network weights, and f is a non-linear activation function. The bias term bi is omitted from the figure. The data inputs or outputs of compute are often referred to as activations. The weighted sums from one or more hidden layers are ultimately propagated to an output layer, which presents the final outputs of the NN to the user.

Deep neural networks (DNNs) have more than 3 layers (i.e., more than one hidden layer). The typical number of network layers used in DNNs can range from 5 to more than a thousand. DNNs are capable of learning high-level features with more complexity and abstraction than shallower neural networks. DNNs can process image data, and for the purposes of explanation only, the present disclosure will be described with reference to DNNs that process image data it being understood the present disclosure should not be limited thereto. In these applications, input data D (e.g. pixels) of an image are fed into the first layer of a DNN, and the outputs of that layer can be interpreted as representing the presence of different low-level features in the image, such as lines and edges. At subsequent layers, these features are then combined into a measure of the likely presence of higher level features, e.g., lines are combined into shapes, which are further combined into sets of shapes. And finally, given all this information, the network provides a probability that these high-level features comprise a particular object or scene. This deep feature hierarchy enables DNNs to achieve superior performance in many tasks.

DNN learning involves determining the value of the neural network weights W and biases b, and is referred to as training the network. Once trained, the DNN can perform its job using the weights W and biases b determined during the training process. Running the DNN with these weights is referred to as inference. When performing an inference, a DNN is given an input image, and the output of the DNN is a vector of scores, one for each object class. The class with the highest score indicates the most likely class of object in the image. The present disclosure relates to DNN inference processing.

DNNs process millions of parameters (data and weights). To illustrate, each layer in a DNN may require millions of multiply operations in which data D and weights W are multiplied. DNN inference is often performed on embedded devices where resources (e.g., memory) are limited. Semi-conductor device and computing architecture advances have continued to provide increased computing capability, which is needed for the large amount of weighted sum computation in DNNs. Nonetheless, there is a growing interest in the design of dedicated hardware accelerators for DNN computation to improve performance, energy efficiency, and/or storage. Energy efficiency is particularly important for DNN accelerators employed in mobile devices that are powered by a battery.

Figure 2A:
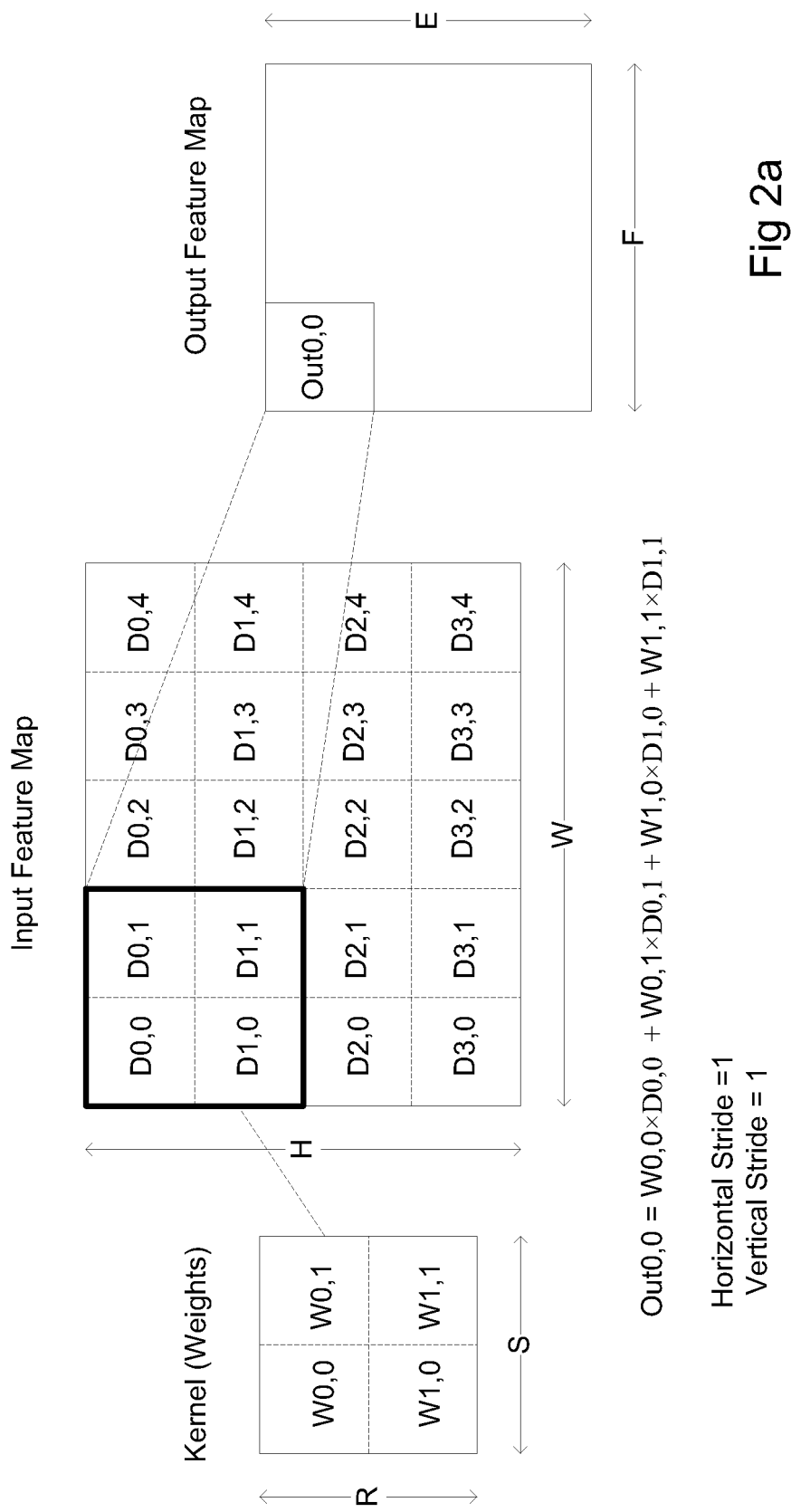
Figure 2B:
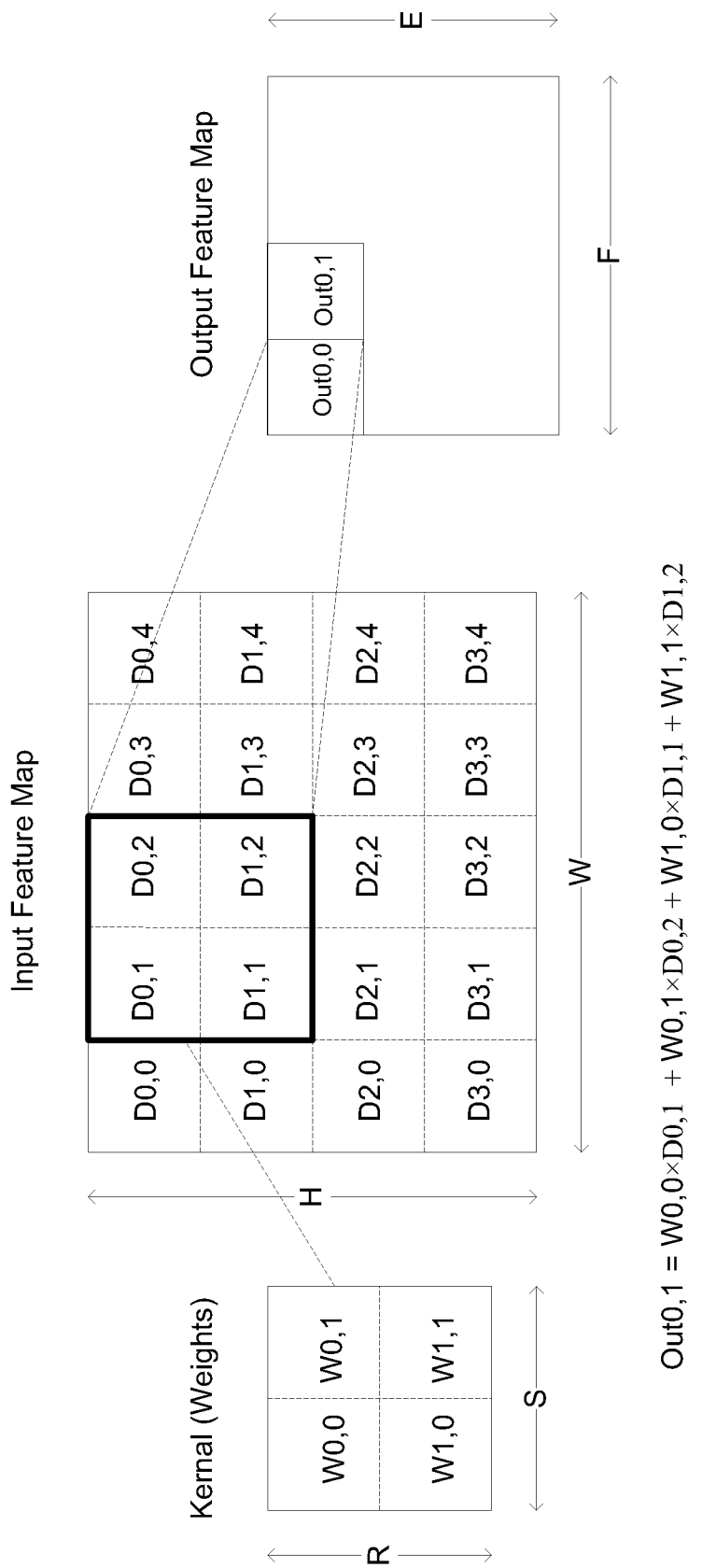

DNNs can be solely composed of fully-connected (FC) layers. FIG. 1 illustrates aspects of a simple FC layer. FC requires a significant amount of storage and computation. Efficiency can be gained if the same set of weights W are used in the calculation of every output. This repeated use of the same weight values is called weight sharing and can significantly reduce the storage requirements for weights. A popular windowed and weight-shared layer arises by structuring the computation as a convolution (CONV), where the weighted sum for each output is computed using only a small block of input data, and where the same set of weights (i.e., a kernel) are shared for every output. FIGS. 2a-2c illustrates operational aspects of an example two-dimensional convolution. These figures show a 4×5 "input feature map" of data (e.g., pixels) or channel. This convolution example uses a 2×2 kernel of weights. The convolution example will produce one output channel or "output feature map." On a high level, the kernel slides (i.e., convolves) over data blocks of the input feature map in both the horizontal and vertical directions with the same stride of one. For each position a dot product between the kernel and the data block, which equal in size to the kernel, is performed. In other words, the overlapping weights of the kernel and data of the block are multiplied, and the products summed. The sum will be the value of the output feature map at the point in the input image where the kernel is centered. FIG. 2a shows Out0,0 in the output feature map, which is the dot product of the kernel and the data block for the first position in the input feature map. FIG. 2b shows Out0,1 in the output feature map, which is the dot product after the kernel strides horizontally by one and overlaps the next data block. FIG. 2c shows the output feature map after the kernel has fully convolved across the input feature map.

Figure 3:
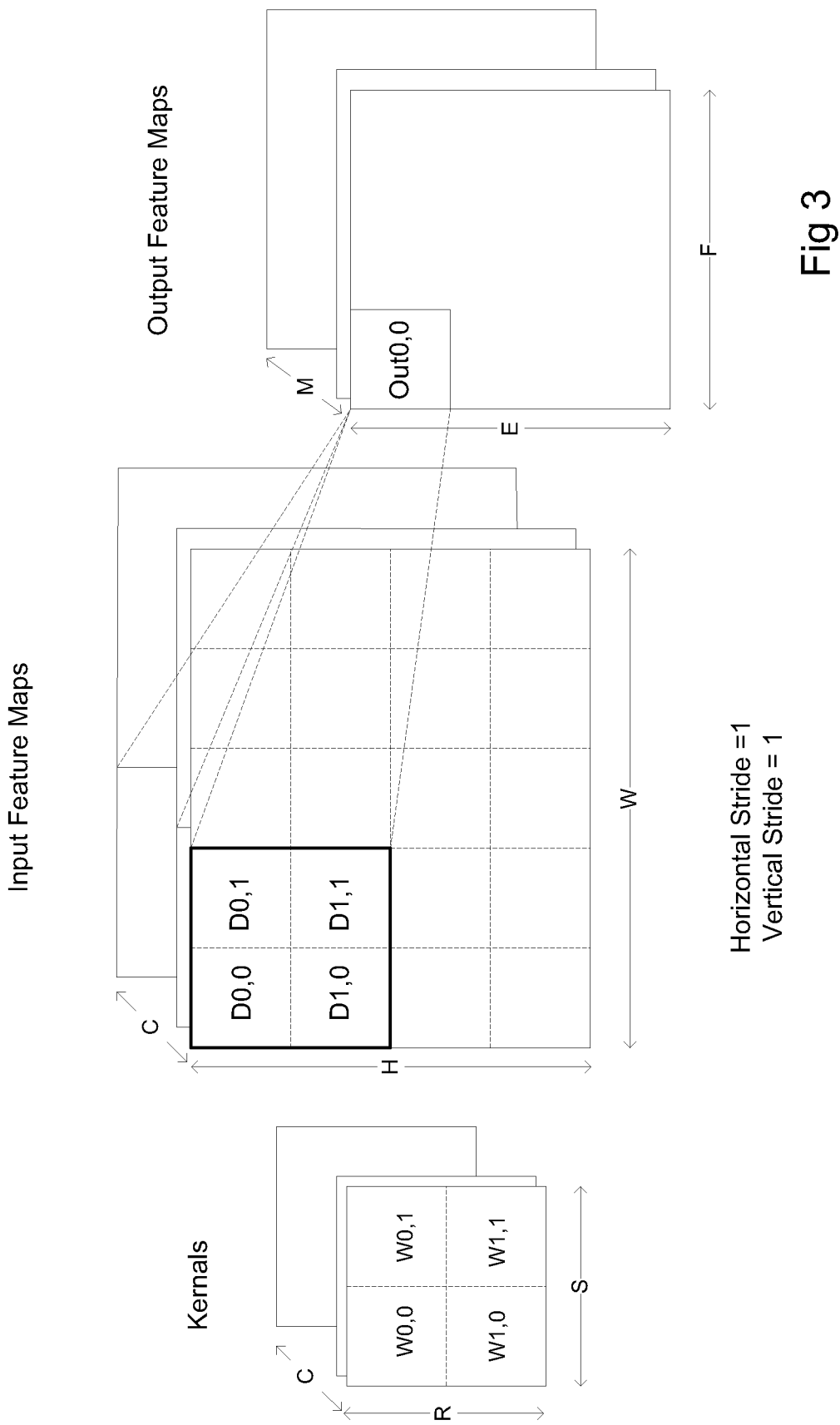
FIG. 3 illustrates operational aspects of a multi-dimensional convolution within a neural network.

Convolutions can be three dimensions or higher. FIG. 3 illustrates operational aspects of a C-dimensional convolution that involves a stack of C kernels and a stack C of input feature maps. Each input feature map is convolved with a distinct kernel. The results of the dot products at each point are summed across all input feature maps. Additional stacks of kernels can be used on the same input to create additional output channels. Multiple input feature maps may be processed together as a batch to potentially improve reuse of the kernel weights. A non-linear activation function is typically applied after each CONV or FC layer. Commonly used non-linear functions include Sigmoid, Tan H, and ReLU. In addition to CONV and FC layers, various optional layers can be found in a DNN such as the non-linearity, pooling, etc.

DNNs can have different 'network architectures' in terms of number of layers, layer types (CONV, FC, etc.), layer shapes (i.e., kernel size, number of input feature maps and kernels), etc. General-purpose compute engines, especially graphics processing units (GPUs), can be configured by software to implement different types the layers. While GPUs are flexible in their ability to implement different types of layers, GPUs are limited in their processing power ability, and cannot keep up with the increasing computational demands of NN processing. Dedicated NN accelerators can provide relatively faster performance. However, prior NN accelerators are relatively inflexible when compared to GPUs.

Prior NN accelerators employ systolic arrays. These accelerators include an array of data processing elements, each of which independently computes a partial result of a layer (e.g., a partial result of a two-dimensional CONV) as a function of data received from its upstream neighbors, stores the result within itself, and passes it downstream. Systolic arrays are very efficient for implementing a specific NN layer such as a two-dimensional CONV of a certain shape. Systolic arrays configured for one type of layer can perform other types of layers. For example, a systolic array configured to implement a two-dimensional CONV, can be used to perform a C-dimensional CONF or a 1×1 CONV. Unfortunately, when used to implement a layer other than that for which it is configured, a systolic array requires costly reread of data and/or weights from memory. For DNNs, the bottleneck for implementing a layer is usually memory access. As a result, systolic arrays are efficient for the specific type of NN layers they are configured to implement. The present disclosure addresses the problems and other by providing a configurable NN accelerator architecture for efficiently implementing different types and shapes of NN layers. For example, the NN accelerator architecture of the present disclosure can be configured to implement a two-dimensional CONV layer using 2×2 data blocks and a 2×2 kernel, and the NN accelerator can be subsequently reconfigured to implement a C-dimensional CONV layer using 3×3 or 5×5 data blocks and 3×3 and 5×5 kernels, respectively. Also, the NN accelerator architecture of the present disclosure may employ a two-dimensional set of registers that allows data reuse in NN layer computations, which increases efficiency and reduces storage requirements.

Figure 4:
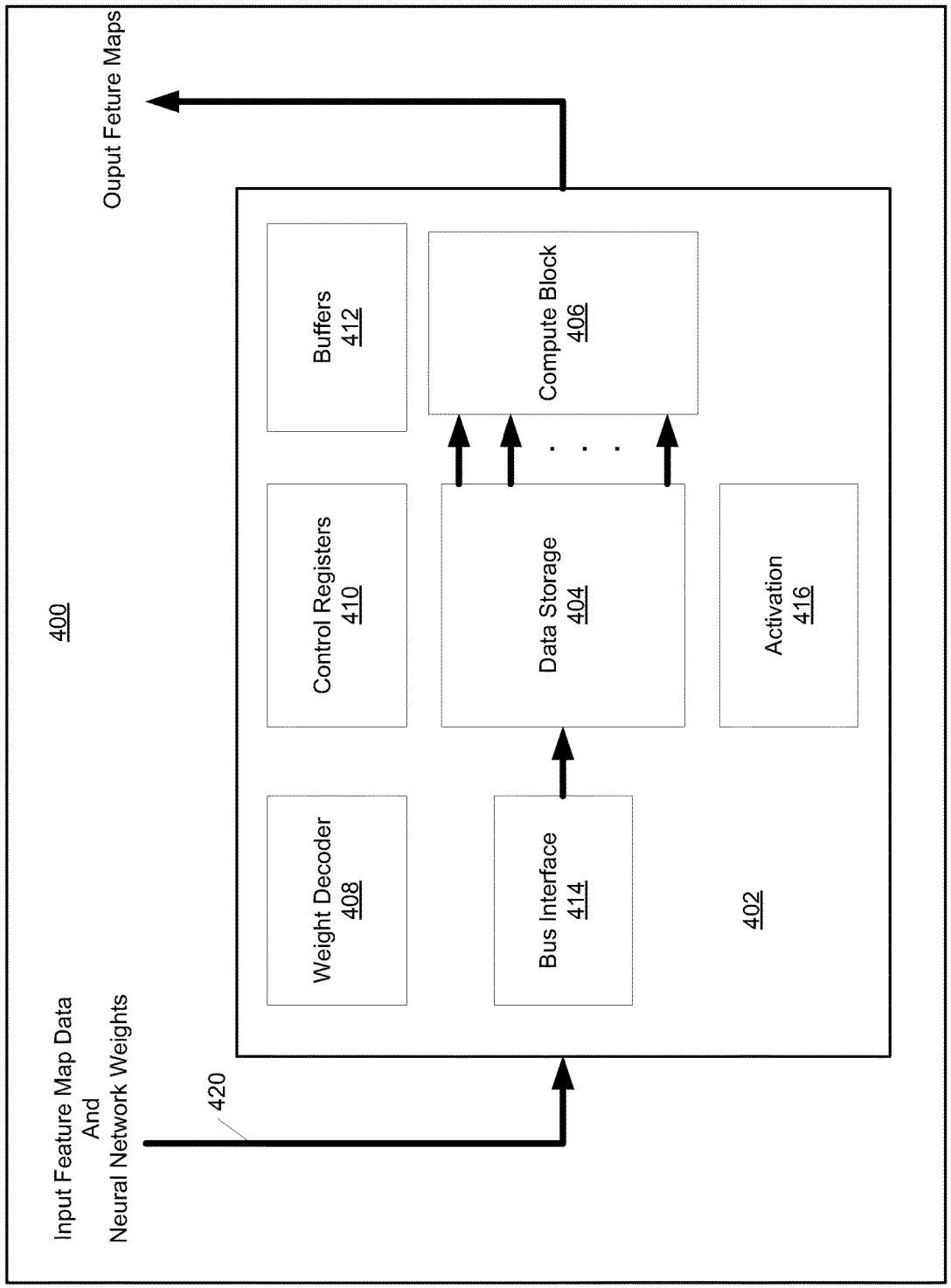
FIG. 4 is a schematic diagram of an integrated circuit that employs a neural network accelerator according to one embodiment.

FIG. 4 is a schematic diagram of an integrated circuit 400 that employs an NN accelerator 402 according to one embodiment. Accelerator 402 includes a data storage circuit 404 in data communication with compute block circuit 406. As will be more fully described below, compute block circuit 406 includes a plurality of compute pipes, each including a plurality of data processing circuits. Each pipe can perform a function such as a partial or full dot product of a kernel and data block. All computation in the pipes can be done with either 1 byte or 2 byte wide data D and weights W. The present disclosure will presume 1 byte wide data D and weights W. Accelerator 402 further includes a neural network weight decoder circuit 408, a set of control registers 410, buffers 412 that can temporarily store data, bus interface circuit 414, and activation circuit 416. Weight decoder 408 can translate encoded weights W using a table. Activation circuit 416 can selectively apply a non-linear activation function such as Sigmoid, Tan H, and ReLU to the outputs of compute block circuit 406.

Accelerator 402 is coupled to a system bus 420, which in turn is connected to other components, such as memory (not shown). Accelerator 402 is configured to receive input feature map data D and neural network weights W from memory via system bus 420. A 128 bit wide system bus 420 can transfer 16 bytes of data D to bus interface circuit 414 with each bus cycle. Or a 64 bit wide system bus 420 can transfer 8 bytes of data D with each bus cycle.

Bus interface circuit 414 can receive multiple bytes of data D during each system bus cycle. Bus interface circuit 414 provides the data to storage circuit 404 for subsequent storage in storage elements thereof. Data storage circuit 404 can load data processing circuits within each compute pipe of compute block circuit 406 with data. The data processing circuits can process the data they receive from data storage circuit 404. For example, each data processing circuit of a pipe can be configured to multiply data D of a data block with a neural network weight W of a kernel provided by weight decoder circuit 408. The data processing circuits can operate in parallel.

Figure 5:
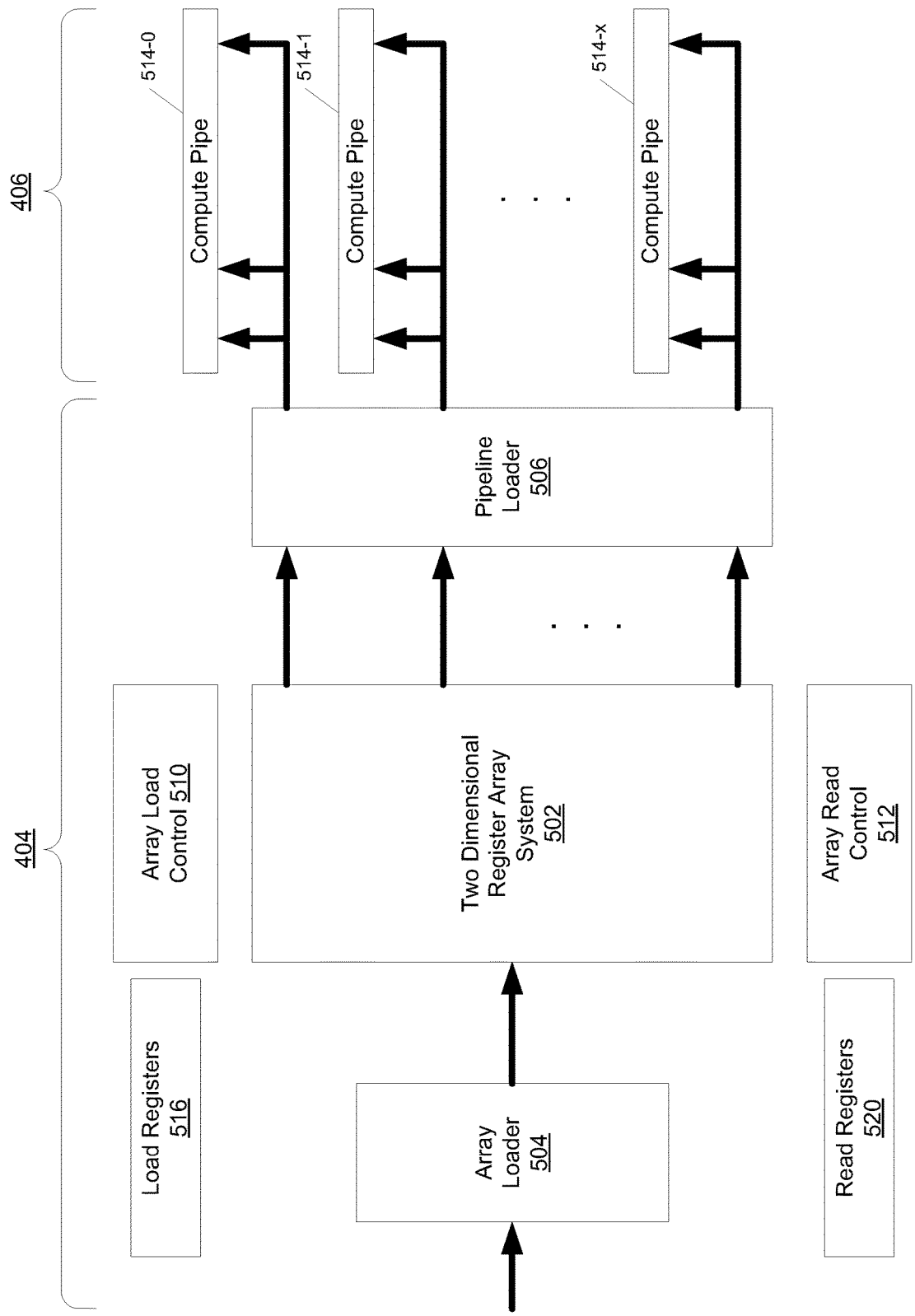
FIG. 5 is a block diagram illustrating relevant components of example data storage circuit and compute block circuit employed in the neural network accelerator of FIG. 4.

FIG. 5 is a block diagram illustrating relevant components of example data storage circuit 404 and compute block circuit 406. Data storage circuit 404 includes a two dimensional array of registers 502 (herein after array 502) coupled between an array loader circuit 504 and a pipeline loader circuit 506. In addition, data storage circuit 404 includes an array-load control circuit 510 that selects sub arrays of registers into which data is to be written by array loader circuit 504. Array-load control circuit 510 selects a position, height (i.e. number or rows) and width (i.e., number of columns) of the sub arrays based upon position, height, and width information contained within load registers 516. Data storage circuit 404 also includes an array-read control circuit 512 that selects multiple sub arrays of registers within array 502 from which pipe loader control circuit 506 reads data in parallel. Array-read control circuit 512 selects positions, height and width of the sub arrays based upon position, height, and width information contained within read registers 520. Pipe loader control circuit 506 loads the data processing circuits of compute pipes 514 with data read from the selected sub arrays, respectively, in parallel.

The two-dimensional array 502 facilitates data reuse amongst compute pipes 514. In one sense, the two-dimensional array 502 can be thought of as a two-dimensional circular data buffer. Array loader circuit 504 can continuously load registers in array 502 after the data contents of those registers have been consumed by compute pipes 514 (i.e., the data is no longer needed for subsequent computations). A central processing unit (CPU not shown) within integrated circuit 400, or other similar device that executes instructions stored in memory, can program the array-load control circuit 510 via load registers 516. More particularly, the values stored into load registers 516 by the CPU configure a load pattern (e.g., height and width of the sub arrays of registers into which data from memory is stored by array loader circuit 504) that is dependent on the type of NN layer to be implemented. Sub arrays within array 502 are sequentially loaded with sets (e.g., 4, 8 or 16) of data D received via the system bus. For example, if the system bus is 4 bytes wide, and the CPU sets the load pattern height value to two, then 2×2 sub arrays of registers will be selected by array load control circuit 510 to store 4 bytes of data as the data arrives. Array loader circuit 504 can load selected register arrays, one below the other, until a vertical dimension defined by another value written to load registers 516, is complete. The loading will continue for as many vertical dimension steps as specified.

Pipe loader circuit 506 can concurrently read from sub arrays of registers within array 502, one below another, that are selected by array-read circuit 512. The selected sub arrays can overlap each other. The CPU can program the array-read control circuit 510 via registers 520 to define the sub array pattern by which pipe loader circuit 506 reads data from array 502. More particular, the values stored into read registers 520 by the CPU configure a read pattern (e.g., height and width of the sub arrays of registers from data read by pipe loader circuit 506) that is dependent on the type of NN layer to be implemented. Pipe loader circuit 506 loads the data processing circuits of compute pipes 514 in parallel with the data read from the selected sub arrays. After each read operation by pipe loader circuit 506, array-read control circuit 512 can select the next set of sub arrays by effectively shifting the horizontal and/or vertical positions of pointers within the array 502, at which pipe loader circuit 506 reads data from sub array registers in the next cycle. In this manner, pipe loader circuit 506 can read from any sub array of registers within array 502. Again, pipe loader circuit 506 can read registers in parallel, and load the data in parallel into data processing circuits of compute pipes 514. When data is fully consumed within a region of registers of array 502, array-load control circuit 510 can shift the load points where array loader circuit 504 overwrites the consumed data with new data that is received from memory.

Figure 6:
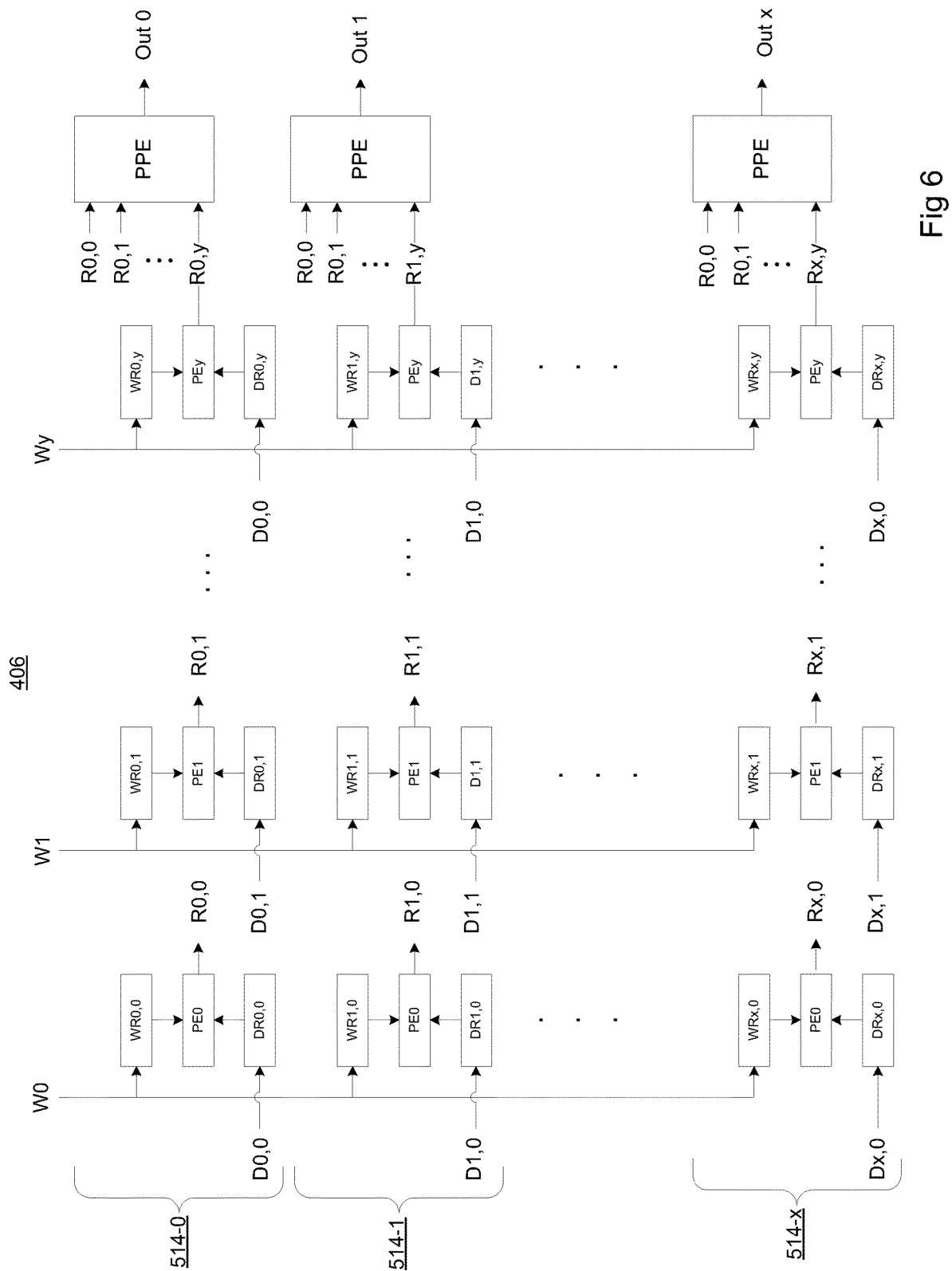
FIG. 6 is a block diagram illustrating example compute pipes of compute block circuit shown in FIG. 5.
Figure 7:
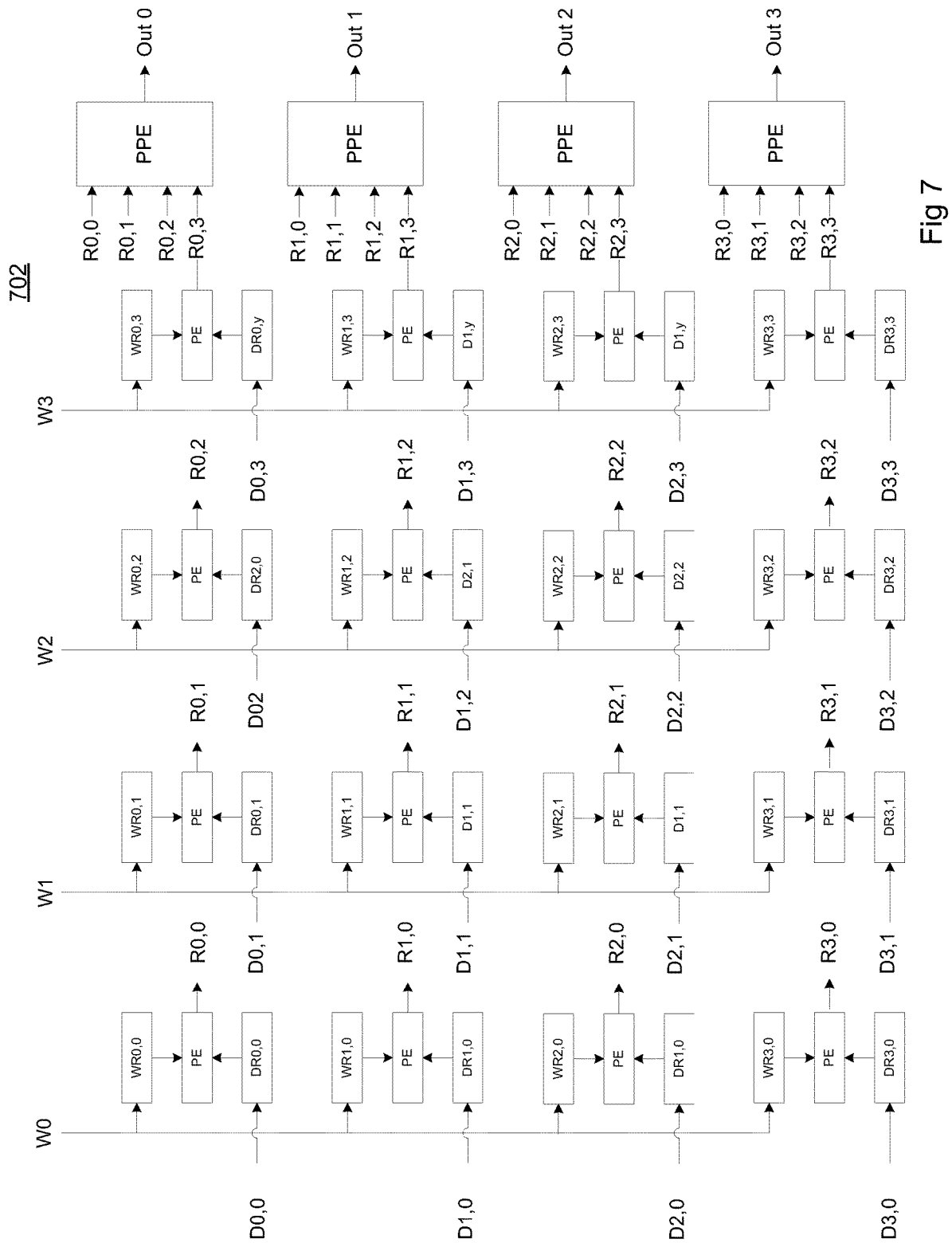
FIG. 7 is a block diagram illustrating an example compute block circuit shown in FIG. 5.

With continuing reference to FIG. 5, FIG. 6 is a block diagram illustrating example compute pipes 514 of compute block 406. Each of the pipes include data processing circuits, which in turn include processing elements PE0-PEy, where y can be an integer (e.g., 4, 8, 16, etc.). Each of the data processing circuits also include registers DR and WR, which are configured to receive and store data D and neural network weights W, respectively, of a one-dimensional or two dimensional kernel. Data D is received from the pipe loader circuit 506. Although not shown, each data processing circuit may also include a local storage to temporarily store the output R of the PE. In one embodiment the number of processing elements PE in each compute pipe and the number of compute pipes 514 are equal. In other words, x and y in FIG. 6 are equal to each other. FIG. 7 is an example compute block 702 that contains 4 pipes 514, each of which contains 4 processing elements PE. Each pipe of compute block 702 can implement functions such as a dot product between a 2×2 kernel and a 2×2 data block, which is stored in a sub array of registers in array 502.

Each of the processing elements PE can be dynamically configured by software executing on the CPU (not shown) to perform an operation that generates result R. For example, a processing element PE can be configured to multiply a neural network weight W and input data D contained within registers WR and DR, respectively. Processing element PE can be reconfigured to simply pass data D contained within register DR. Other PE configurations are contemplated. The contents of the local storage can also be provided for processing by processing element PE.

Each of the compute pipes 514 also includes a pipe processing element PPE, each of which is configured to receive results R from each of the processing elements PE within the pipe during a cycle. Pipe processing element PPE is configured by the CPU to process inputs R. For example, PPE can be configured to add the results R to generate an output Out. PPE can be reconfigured to calculate an average of the results R it receives from each PE. In still another embodiment, PPE can be reconfigured to select the largest or the smallest of the results R from the PEs. The PPEs can be reconfigured by the CPU as needed.

With continuing reference to FIGS. 5-7, each of the data registers DR is writable by pipe loader circuit 506. Each of the weight registers WR is configured to receive a weight W. In the embodiments shown in FIGS. 6 and 7, corresponding registers WR across the pipes 514 receive the same neural network weight W. In other words, registers WRz,0 receive and store neural network weight W0, registers WRz,1 receive and store neural network weight W1, etc. In one embodiment the weights can be different. In another embodiment the weights can be equal to each other. In still other embodiments some but not all of the weights may the same or set to 0.

Figure 8A:
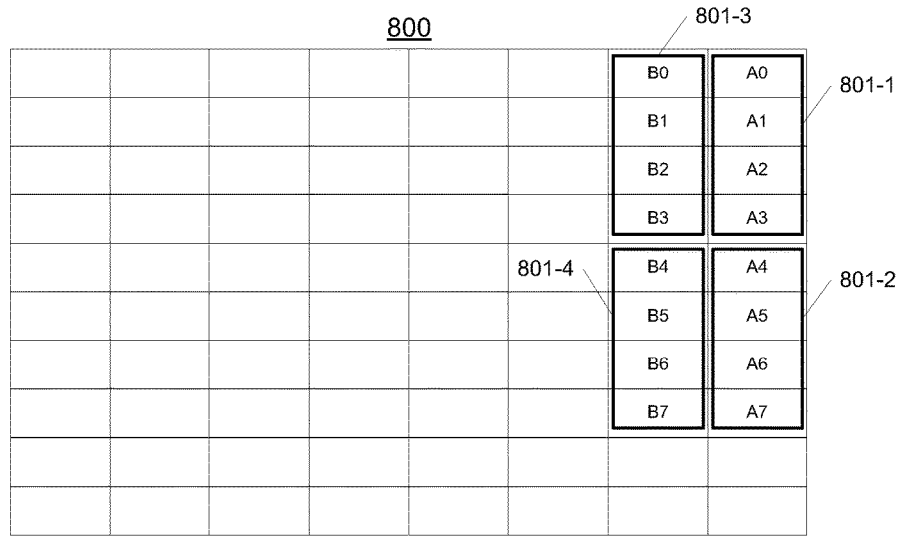
FIG. 8a illustrates the example compute block shown in FIG. 7 and an example register array.
Figure 8A:
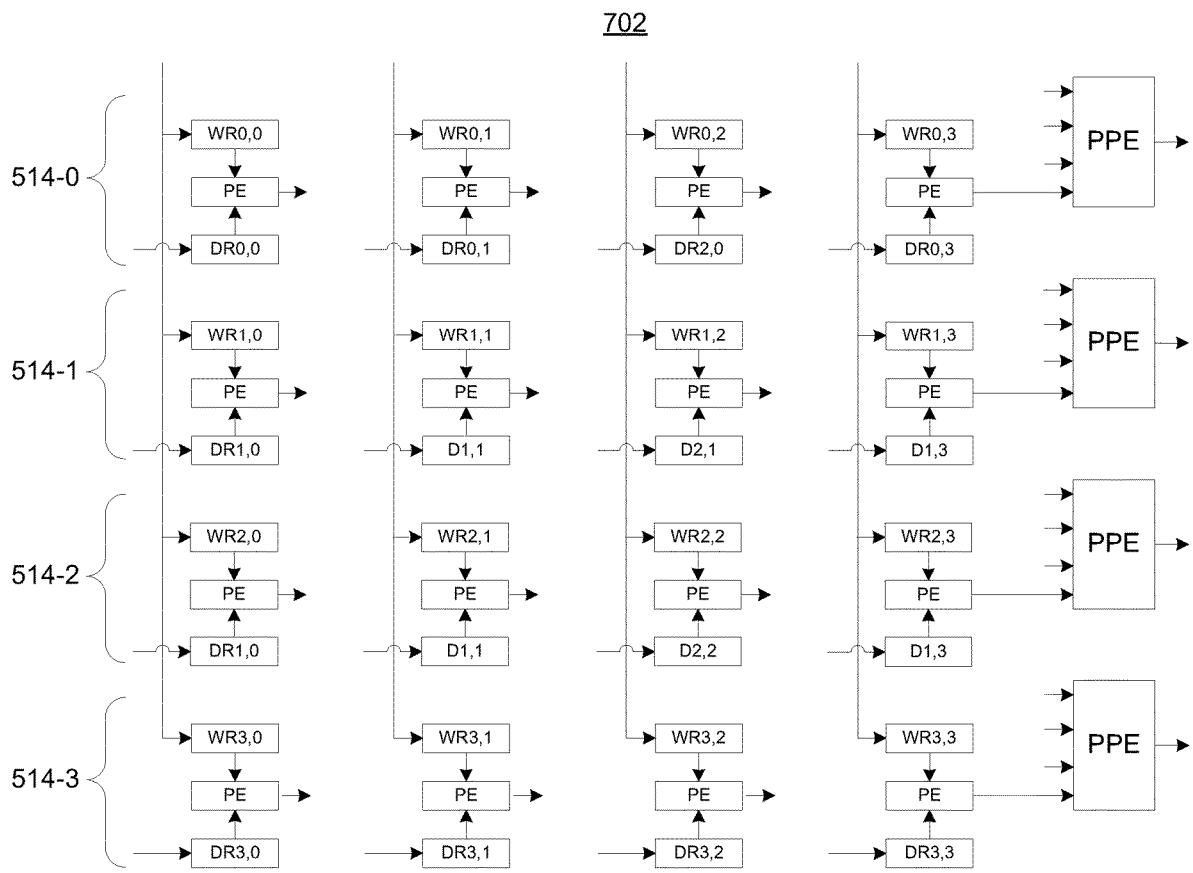

In one embodiment, the number of registers within each row of array 502 should equal two times the number of processing elements PE within each compute pipe 514. And the number of registers within each column of array 502 should be equal to or greater than the number of processing elements PE in each compute pipe 514. FIG. 8a illustrates an example register array 800. Array 800 has a height of 10 registers and a width of 8 registers, which is twice the number of processing elements PE in the pipes 514 of example compute block 702, which is also shown in FIG. 8a.

FIG. 8a shows data loaded into registers of array 800 by array loader circuit 504 according to a pattern implemented by array-load control circuit 510 based upon height, width and other values in load registers 516 for implementing a first type of NN layer (e.g., a two-dimensional CONV layer). The data is stored in 4 consecutive load cycles. In each cycle 4 bytes of data are received from bus 420 and loaded in respective registers of a sub array defined by height=4 and width=1. In the first cycle, array loader circuit 504 receives data A0-A3 in parallel from memory via memory bus 420. Array-load control circuit 510 selects a first sub array 801-1 into which the new data will be stored. Array loader control circuit 504 stores data A0-A3 in the first sub array 801-1 as shown. In next load operation, array loader circuit 504 receives image data A4-A7 in parallel from memory via memory bus 420. Array load-control circuit 510 selects the next sub array 801-2. Array loader control circuit 504 stores data A4-A7 in sub array 801-2 selected by array-load control circuit 510 as shown. Array loader circuit 504 receives the next set of data B0-B3 from memory. Array load control circuit 510 selects sub array 801-3 into which B0-B3 is to be stored. Array loader circuit 504 stores the data as shown in FIG. 8a. FIG. 8a also shows the result of storing the fourth set of data B4-B7 that array loader circuit 504 receives from memory. Array load control circuit 510 selects the next sub array 801-4 into which B4-B7 is to be stored. Array loader circuit 504 stores the data in the selected array as shown.

Figure 8B:
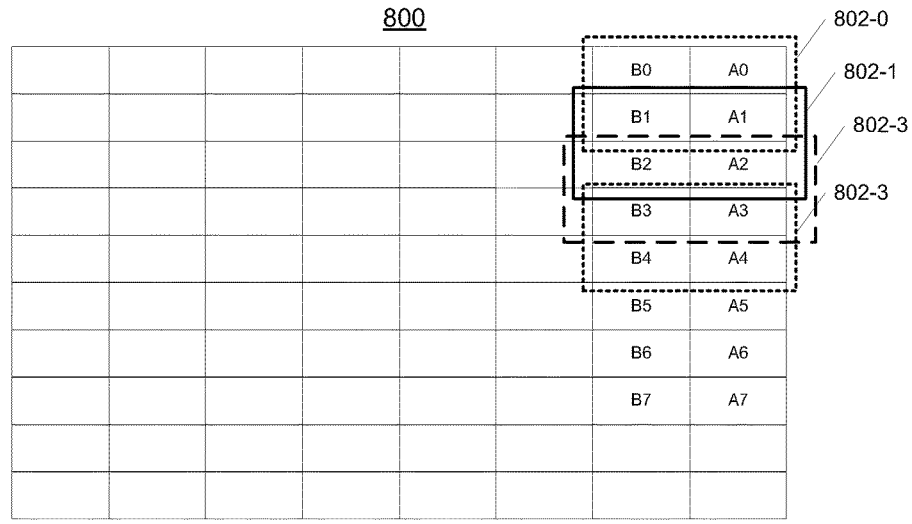
Figure 8B:
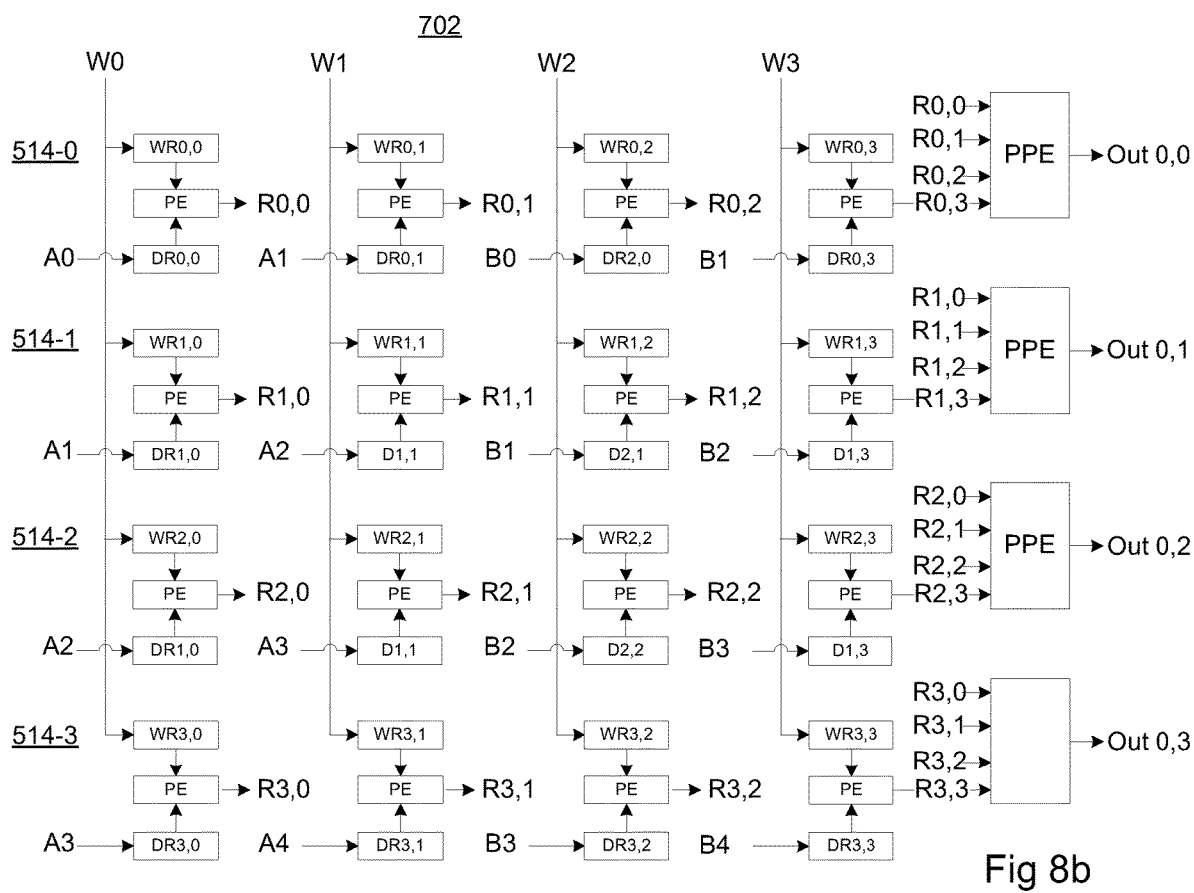

After array loader circuit 504 loads sufficient image data into array 800, array-read control circuit 512 selects sub arrays from which pipe loader circuit 506 reads data. In the illustrated example, array-read control circuit 512 is configured to select 4 sub arrays with height=2 and width=2 in accordance with the read pattern defined within read registers 520 for implementing the first type of NN layer (e.g., two-dimensional CONV layer). FIG. 8b shows sub arrays 802-0-802-3 selected by array-read control circuit 512 based upon the 2×2 read pattern. Pipe loader circuit 506 loads data from the selected sub arrays 802-0-802-3 into the data processing circuits of pipes 514-0-514-3, respectively. More particularly the data is loaded in respective data registers DR in parallel. FIG. 8b shows data from sub arrays 802-0-802-3 loading into respective registers DR for storage therein. FIG. 8b also shows neural network weights W0-W3 loading into weight registers WR for storage therein. After pipe loader circuit 506 loads data registers DR, each of processing elements PE processes (e.g., multiplies) the contents of its registers DR and WR to produce result R. The processing elements PE operate in parallel to produce their results R. The pipe processing element PPE in each pipe 514 receives the results R from the processing elements PE in parallel. Thereafter, each PPE processes (e.g., adds) the results R. Loader circuit 504 can load additional sub arrays with new data received from memory as pipe loader circuit 506 loads processing elements within pipes 514.

Figure 8C:
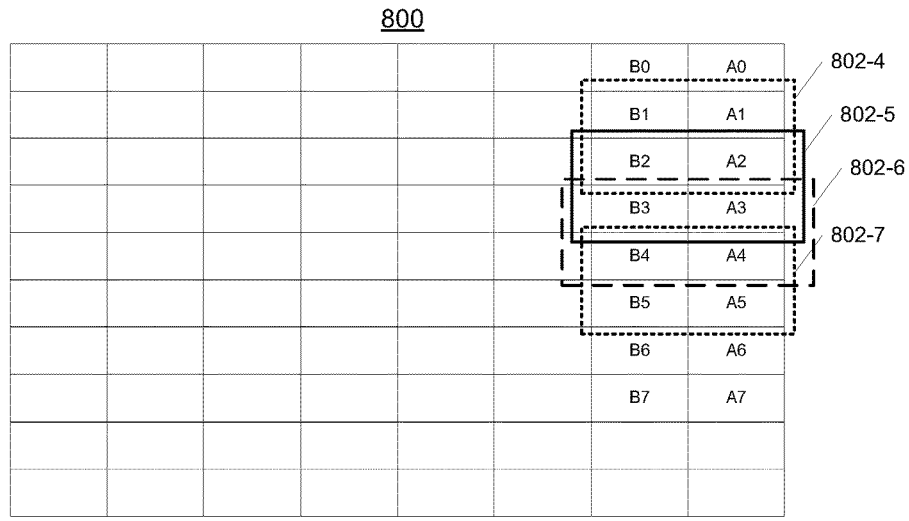
Figure 8C:
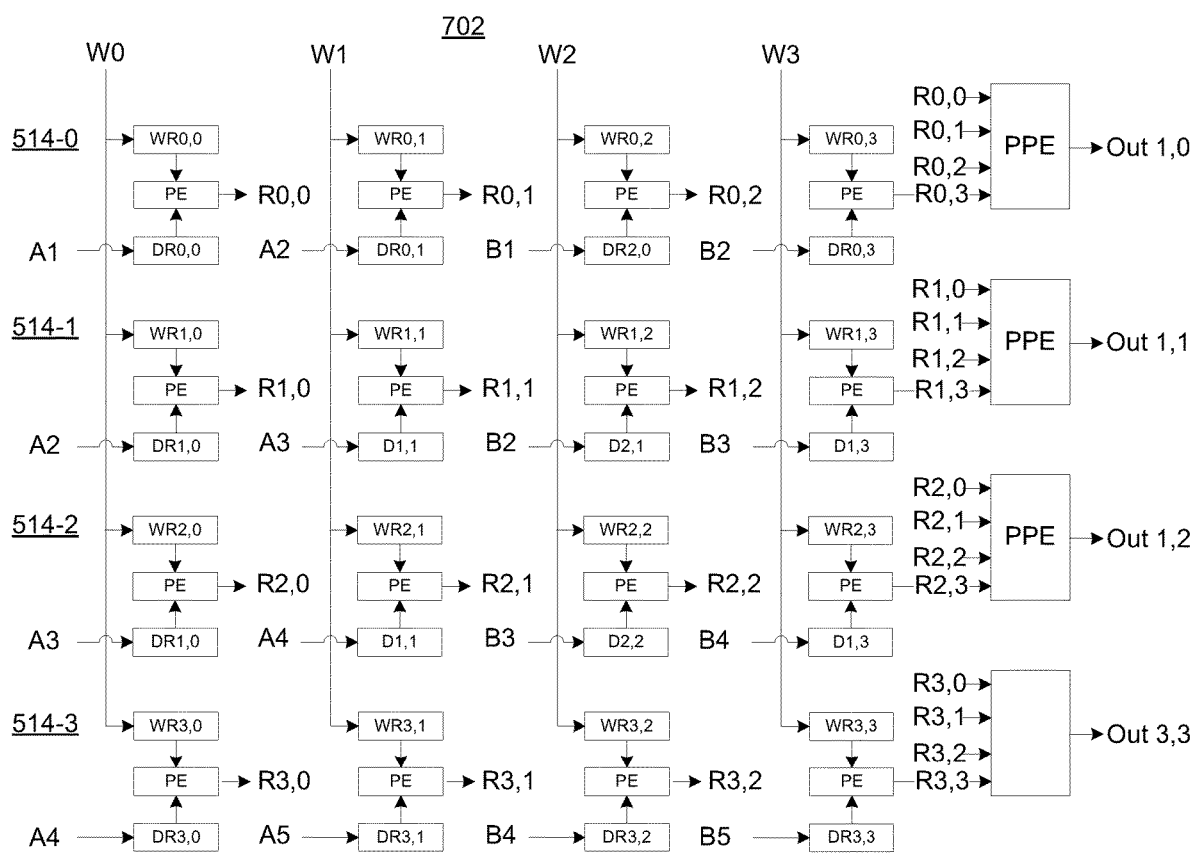

The cycle of sub array selection, data read, data load, and data process is repeated. In the next read sub cycle, array read control circuit 512 selects the next set of sub arrays based upon horizontal and/or vertical stride value(s) stored within read registers 520 by the CPU (not shown). FIG. 8c shows sub arrays 802-4-802-7 selected by array-read control circuit 512 in the next array read cycle. Pipe loader circuit 506 reads data from selected sub arrays 802-4-802-7, and loads the data into the data processing circuits of pipes 514-0-514-3, respectively. FIG. 8c shows data from the selected sub arrays loading into respective registers DR. After pipe loader circuit 506 loads data registers DR, each of the processing elements PE multiply the contents within register DR and register WR, which has remained unchanged (i.e., weight W is reused). Importantly, much of the data that was processed by PEs in the first cycle is processed again in the next cycle. Processing elements in each pipe provide their outputs to their corresponding PPE, which in turn processes the results to generate Out1,z.

Figure 8D:
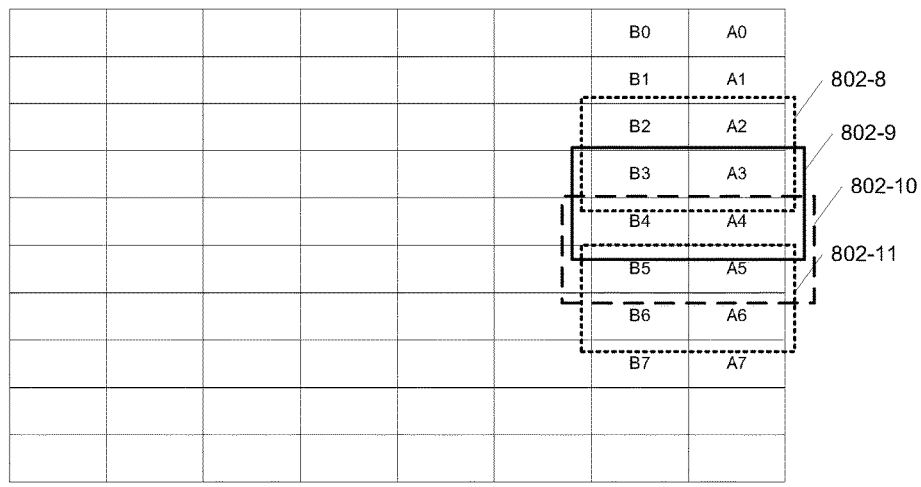
Figure 8D:
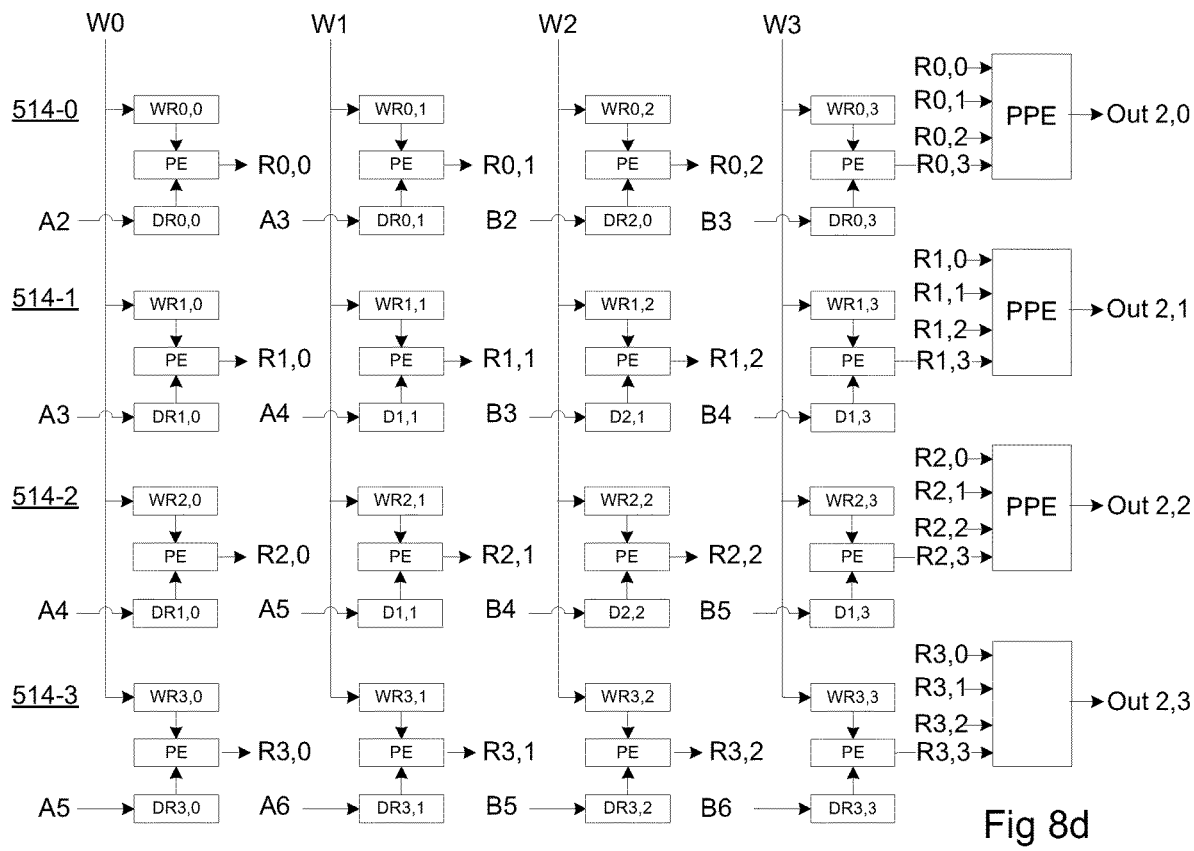

In the subsequent cycle, array read control circuit 512 selects the next set of sub arrays. FIG. 8d shows sub arrays 802-8-802-11 selected by array-read control circuit 512. Pipe loader circuit 506 reads and loads data from selected sub arrays 802-8-802-11 into the data processing circuits of pipes 514-0-514-3, respectively. FIG. 8d shows pipe loader circuit 506 loading data from the selected sub arrays being loaded into respective registers DR. After pipe loader circuit 506 loads data registers DR, each of the processing elements PE multiply the contents with the neural network weight in weight register WR. Processing elements in each pipe provide their outputs to their corresponding PPE, which in turn processes the results to generate Out2,z.

Figure 8E:
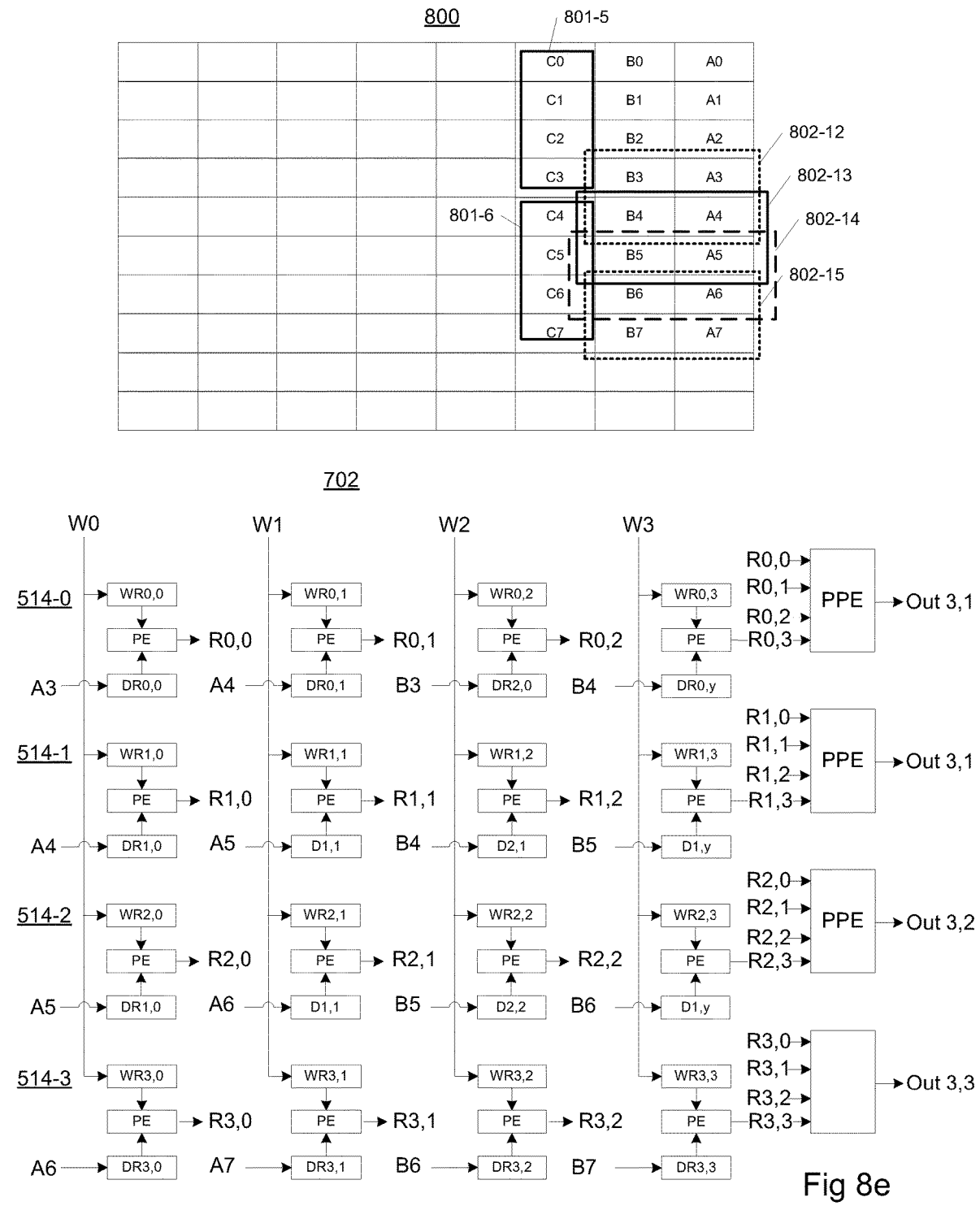

Array read control circuit 512 in the next read cycle selects sub arrays 802-12-802-15. FIG. 8e shows sub arrays selected by array-read control circuit 512. Pipe loader circuit 506 loads data from selected sub arrays 802-12-802-15 into the data processing circuits of pipes 514-0-514-3, respectively. FIG. 8e shows pipe loader circuit 506 loading data from the selected sub arrays into respective registers DR. After pipe loader circuit 506 loads data registers DR, each of the processing elements PE multiply the contents within its data register DR with the neural network weight in its weight register WR. Processing elements in each pipe provide their outputs to their corresponding PPE, which in turn processes the results to generate Out3,z. FIG. 8e also shows the results of two additional load cycles in which array loader circuit 504 sequentially stores data C0-C3 and C4-C7 in sub arrays 801-5 and 801-6, respectively, selected by array load control circuit 510.

Figure 8F:
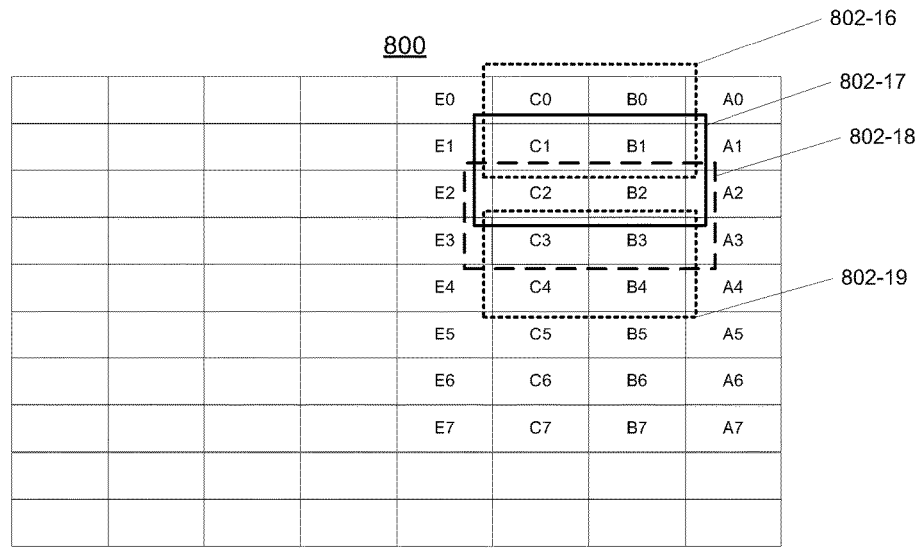
Figure 8F:
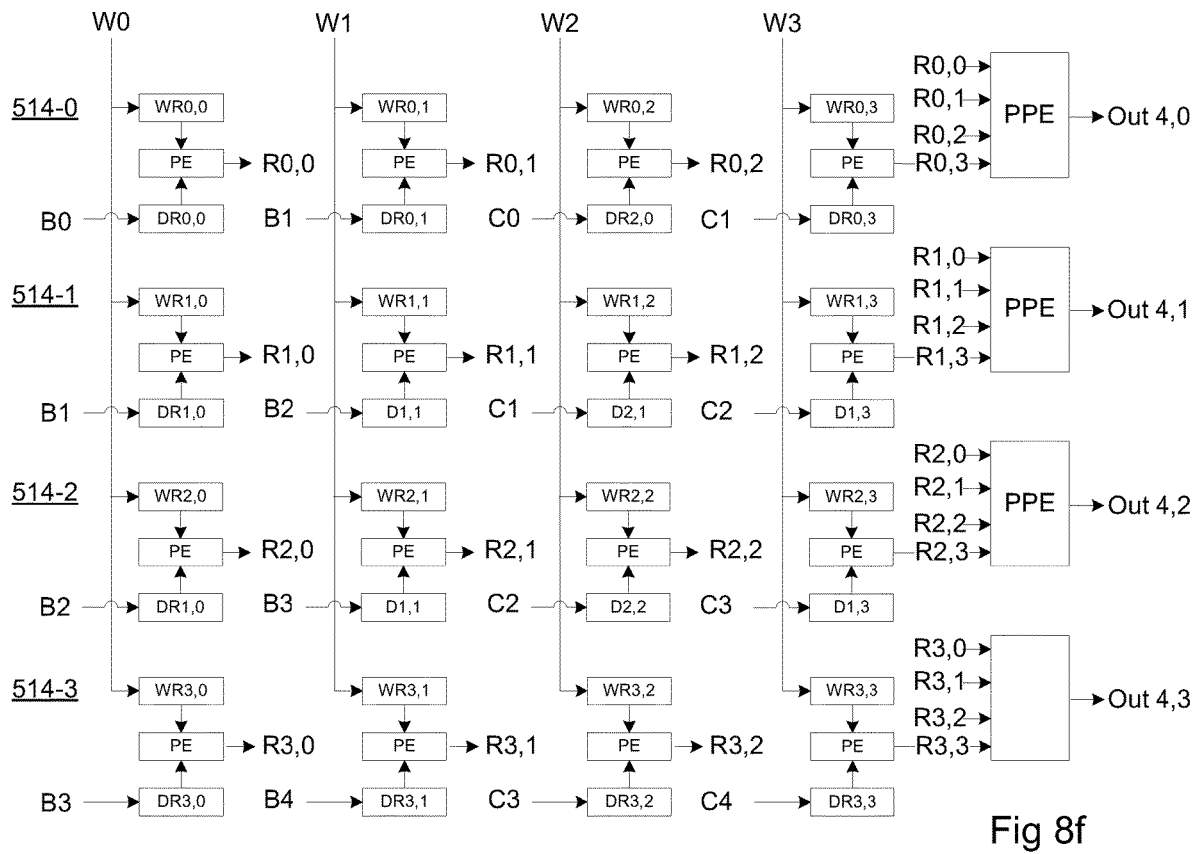

In the next read cycle, array read control circuit 512 selects the next set of sub arrays. FIG. 8f shows the next sub arrays 802-16-802-19 selected by array-read control circuit 512. Pipe loader circuit 506 loads data from selected sub arrays 802-16-802-19 into the data processing circuits of pipes 514-0-514-3, respectively. FIG. 8f shows pipe loader circuit 506 loading data from the selected sub arrays into respective registers DR. After pipe loader circuit 506 loads data registers DR, each of the processing elements PE multiply the contents within data register DR with the neural network weight in weight registers WR. Processing elements in each pipe provide their outputs to their corresponding PPE, which in turn processes the results to generate Out4,z. FIG. 8f also shows the results of two additional load cycles in which array loader circuit 504 sequentially stores data E0-E3 and E4-E7 in sub arrays 801-5 and 801-6, respectively, selected by array-load control circuit 510.

Figure 8G:
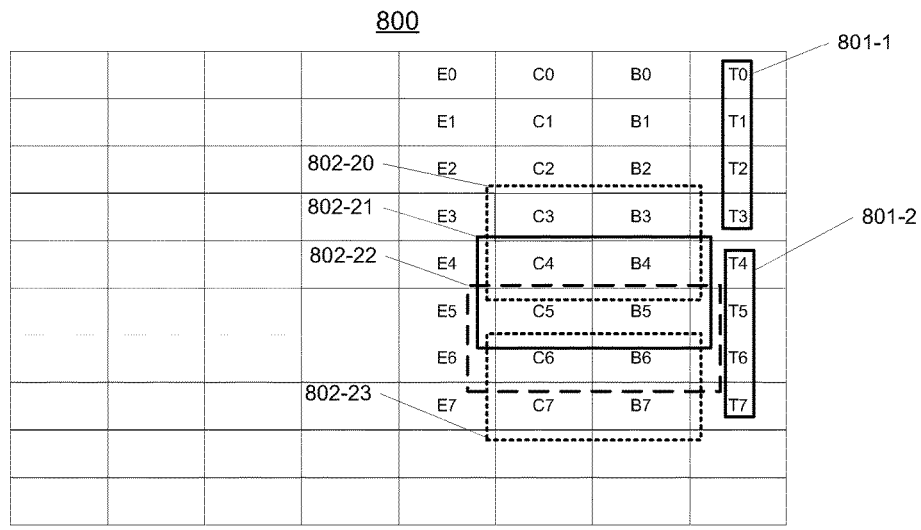
Figure 8G:
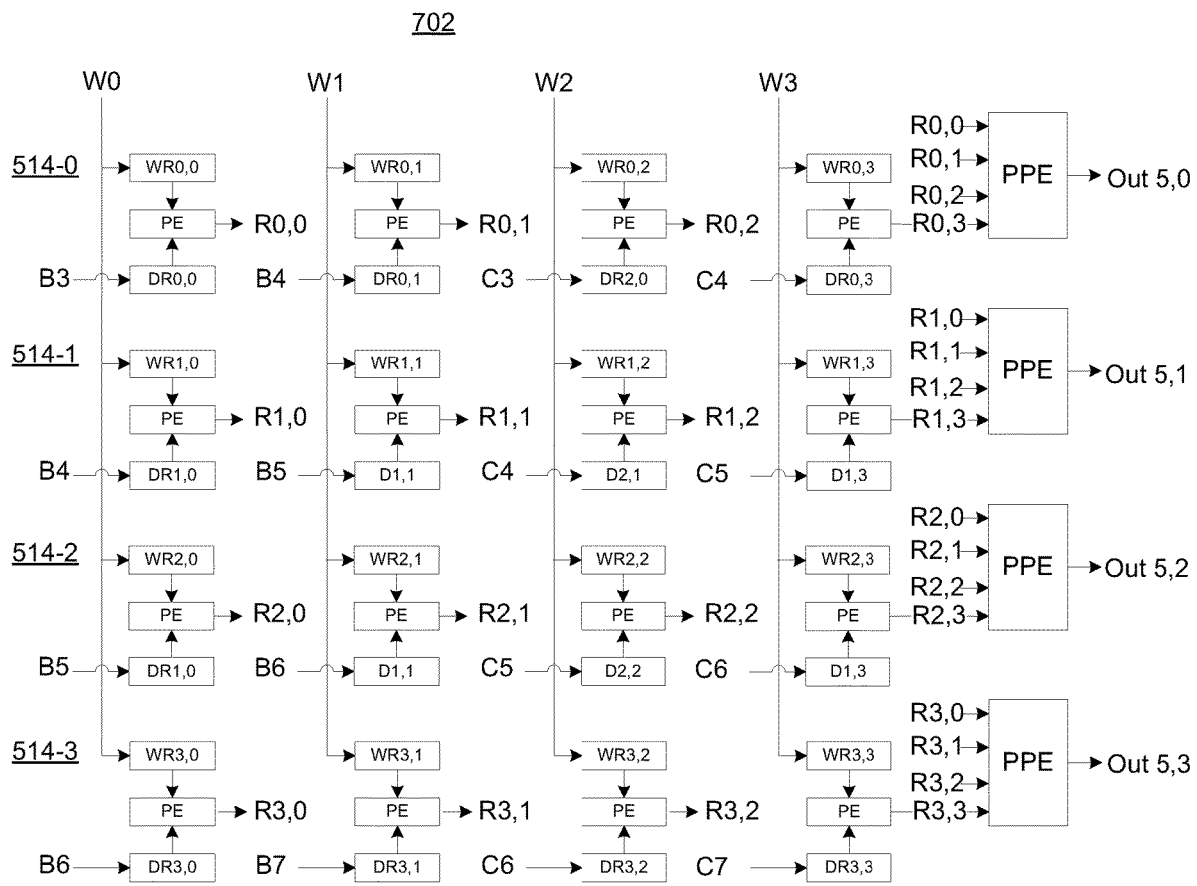

After several more cycles, array read control circuit 512 selects sub arrays 802-20-802-23 shown in FIG. 8g. Pipe loader circuit 506 loads data from selected sub arrays 802-20-802-23 into the data processing circuits of pipes 514-0-514-3, respectively. FIG. 8g shows pipe loader circuit 506 loading data from the selected sub arrays into respective registers DR. After pipe loader circuit 506 loads data registers DR, each of the processing elements PE multiply the contents within data register DR with the neural network weight in weight register WR. Processing elements in each pipe provide their outputs to their corresponding PPE, which in turn processes the results to generate Out5,z. FIG. 8g also shows the results of additional load cycles in which array loader circuit 504 sequentially overwrites consumed data A0-A3 and A4-A7 with new data T0-T3 and T4-T7, respectively, in sub arrays 801-1 and 801-2 selected by array load control circuit 510.

Figure 9:
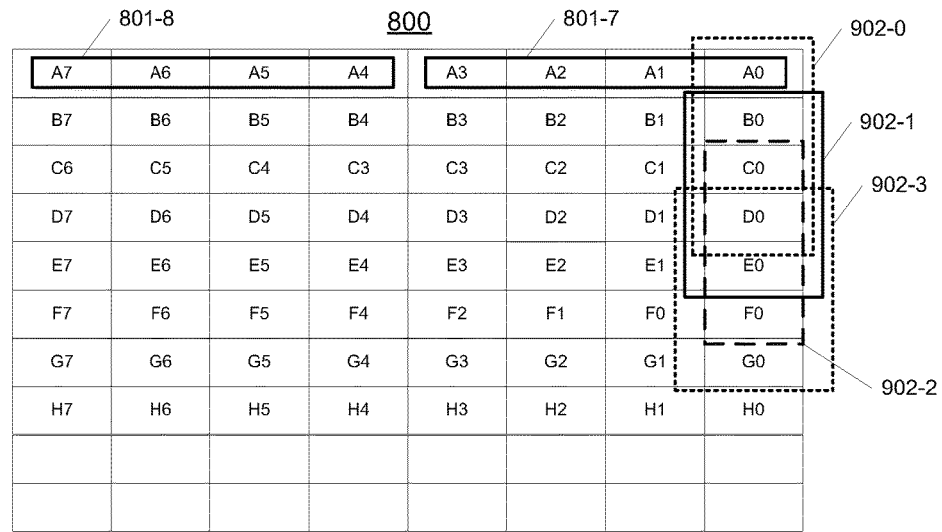
FIG. 9 illustrates aspects of the example compute block and register array shown in FIG. 8a while operating in a different mode.
Figure 9:
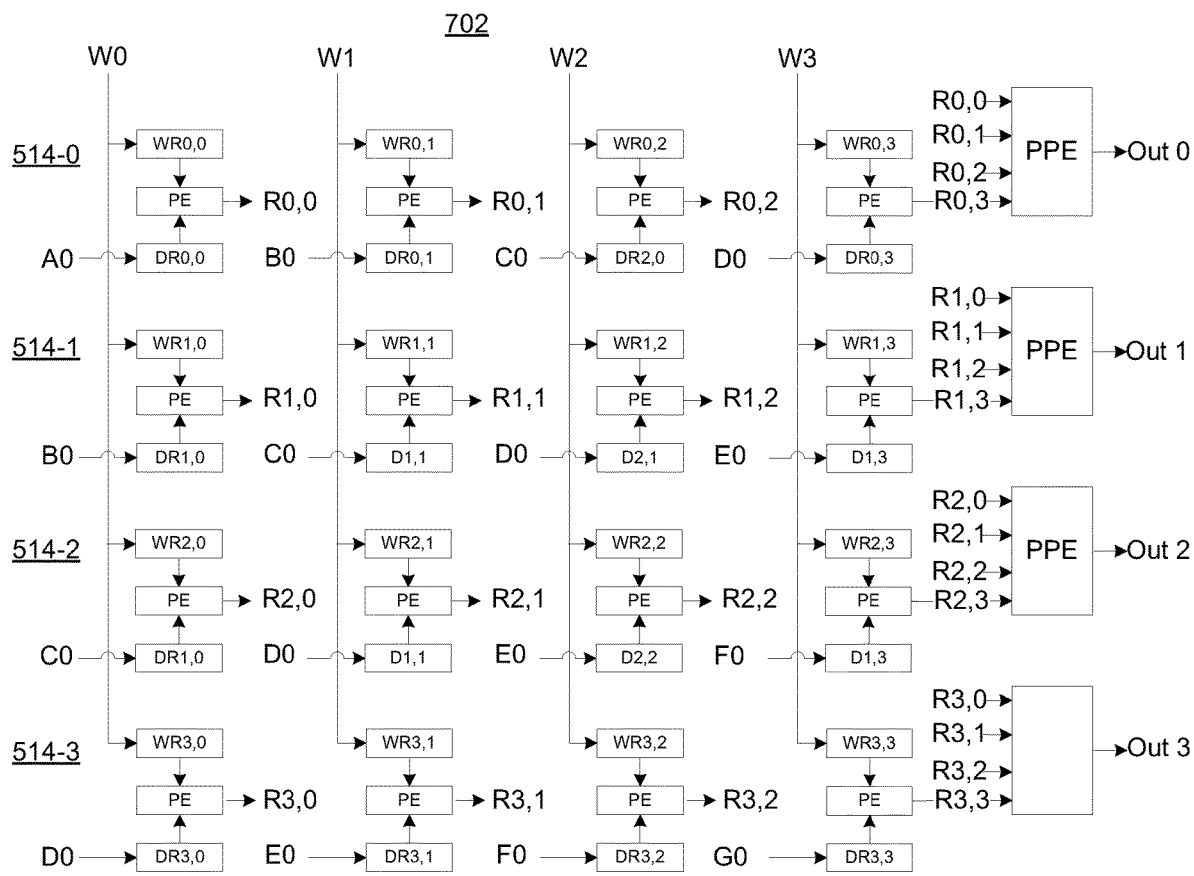

FIGS. 8a-8g illustrate one example in which array loader circuit 504 loads new data into sub arrays that are selected by array-load control circuit 510 according to one load pattern for implementing a first type of NN layer. The figures also illustrate an example of how pipe loader circuit 506 reads sub arrays selected by array-read control circuit 512 according to a read pattern for implementing the first type of NN layer. FIG. 9 illustrates an additional example. FIG. 9 shows data loaded into registers of sub arrays with height=1 and width=4 selected by array-load control circuit 510 for implementing a second type of NN layer. Data is loaded into select sub arrays with each cycle of memory bus 420. For example, in the first and second cycles, array loader circuit 504 sequentially loads new data A0-A3 and A4-A7 into separate sub arrays 801-7 and 801-8 as shown. In the next two cycles, array loader circuit 504 loads B0-B3 and B4-B7 into separate sub arrays selected by array load control circuit 510. In subsequent cycles, array loader circuit 504 stores data received from memory as shown in FIG. 9.

After array loader circuit 504 loads sufficient image data into array 800, array-read control circuit 512 begins selecting sub arrays from which pipe loader circuit 506 reads data. In FIG. 9, array-read control circuit 512 is configured to select 4 sub arrays with height=4 and width=1 in accordance with the read pattern defined within read registers 520 for implementing the second type of NN layer. FIG. 9a shows sub arrays 902-0-902-3 selected by array-read control circuit 512 based upon the 4×1 read pattern. Pipe loader circuit 506 loads data from the selected sub arrays 902-0-902-3 into the data processing circuits of pipes 514-0-514-3, respectively. FIG. 9 shows data from sub arrays 902-0-902-3 loading into respective registers DR for storage therein. After pipe loader circuit 506 loads data registers DR, each of processing elements PE multiplies the contents of its DR and WR to produce results R. The processing elements PE operate in parallel to produce their results R. The pipe processing element PPE in each pipe 514 receives the results R from the processing elements PE in parallel. Thereafter, each PPE processes (e.g., adds) the inputs to produce output Out. It is noted that array loader circuit 504 may be loading additional sub arrays with new data received from memory as pipe loader circuit 506 loads processing elements within pipes 514.

Figure 10:
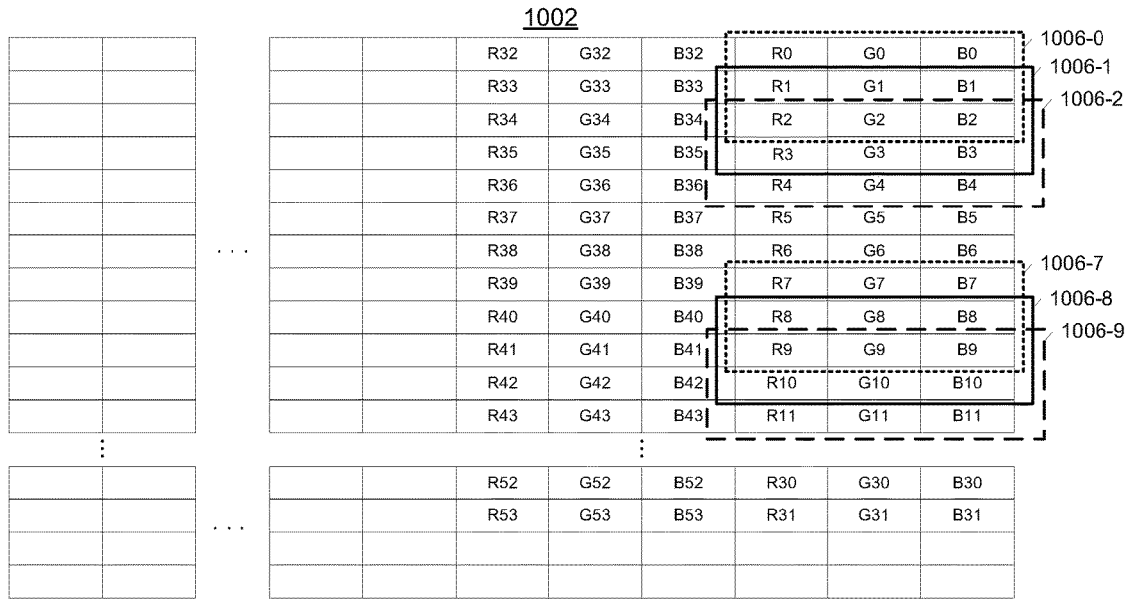
FIG. 10 illustrates an example of another register array and compute block shown in FIG. 5, and operational aspects thereof.
Figure 10:
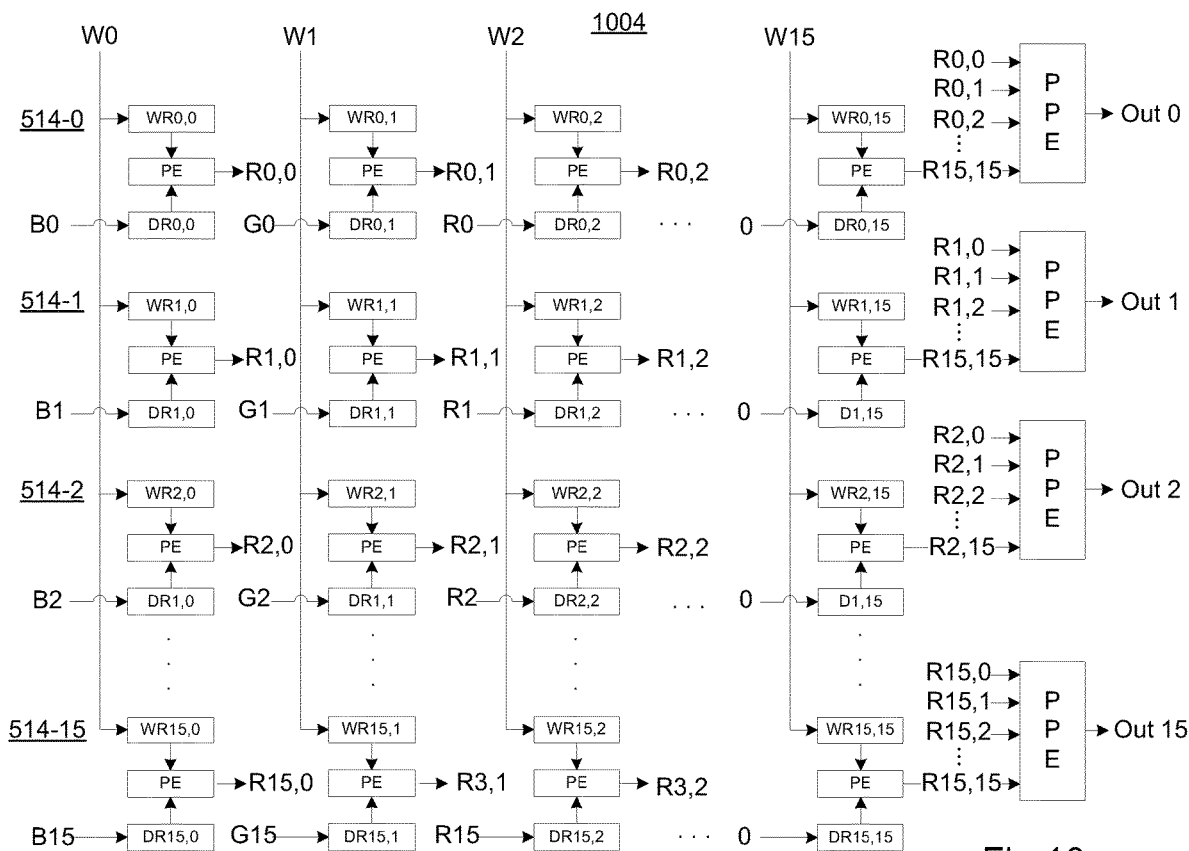

FIGS. 8a and 9 illustrate examples of array 800 containing 8 columns and 10 rows of registers. These figures also show compute pipe block 702 that includes 4 pipes, each containing 4 data processing circuits. Each pipe in example 8a implements a dot product between a 2×2 kernel and a 2×2 data block of an input feature map. The present disclosure should not be limited thereto. FIG. 10 illustrates an array 1002, which contains 32 columns and 34 rows of registers. FIG. 10 also shows a compute pipe block 1004 that contains 16 pipes 514-0-514-15, each containing 16 data processing circuits. Each of the pipes can fully implement a dot product for 2×2, 3×3, and 4×4 kernels and data blocks. Each of the pipes can implement larger dot products for larger kernel and data blocks (e.g., 5×5 kernels and data blocks) in consecutive cycles.

FIG. 10 shows data loaded into registers of sub arrays with height=16 and width=1 by array loader circuit 514 for implementing third type of NN layer (e.g., a 5-dimensional CONV). As before array loader circuit 504 can sequentially load sub arrays selected by array load control circuit 510. For example, in first and second cycles, array loader circuit 504 sequentially loads new data B0-B15 and B16-B31 of a first feature map into separate sub arrays selected by load control circuit 510 as shown. In third and fourth cycles, array loader circuit 504 sequentially loads new data G0-G15 and G16-G31 of a second feature map into separate sub arrays selected by load control circuit 510 as shown. In fifth and sixth cycles, array loader circuit 504 sequentially loads new data R0-R15 and R16-R31 of a third feature map into separate sub arrays selected by load control circuit 510 as shown, and so on. FIG. 10 shows additional data loaded into respective sub arrays from the first feature map by array loader circuit 504 during a subsequent cycle.

After array loader circuit 504 loads data into array 1002, array-read control circuit 512 selects sub arrays from which pipe loader circuit 506 reads data for implementing the third type of NN layer. In FIG. 10, array-rate control circuit 512 is configured to select 16 sub arrays each with height=3 and width=3. FIG. 10 shows several (1006-0-1006-2 and 1006-7-1006-9), but not all of the sub arrays selected by array-rate control circuit 512 based upon the 3×3 read pattern. Pipe loader circuit 506 loads data from the selected sub arrays into DR registers of pipes 514-0-514-15, respectively. FIG. 10 shows data loading into DR registers of the data processing circuits. For example, FIG. 10 shows registers DR0,0, DR0,1, and DR0,2 being loaded with B0, G0, and R0, respectively. FIG. 10 does not show it, but registers DR0,3, DR0,4, and DR0,5 are loaded with B1, G1, and R1, respectively, and registers DR0,6, DR0,7, and DR0,8 are loaded with B2, G2, and R2, respectively. Pipes 514-1-514-15 are loaded in similar fashion. It is noted that only 9 of the 16 DR registers in each pipe 514 are loaded with data during each read cycle. Pipe loader circuit 506 loads the remaining 6 DR registers in each pipe with 0. After pipe loader circuit 506 loads data registers DR, each of the processing elements PE multiply the contents of its corresponding DR and WR registers, to produce results R. The processing elements PE operate in parallel. Pipe processing element PPE in each pipe 514 receives the results from the processing elements PE. Thereafter, each PPE processes (e.g., adds) the inputs to produce output out. In this manner, each pipe 514 implements a dot product between a 3×3 kernel and 3×3 data block during each cycle.

Figure 11A:
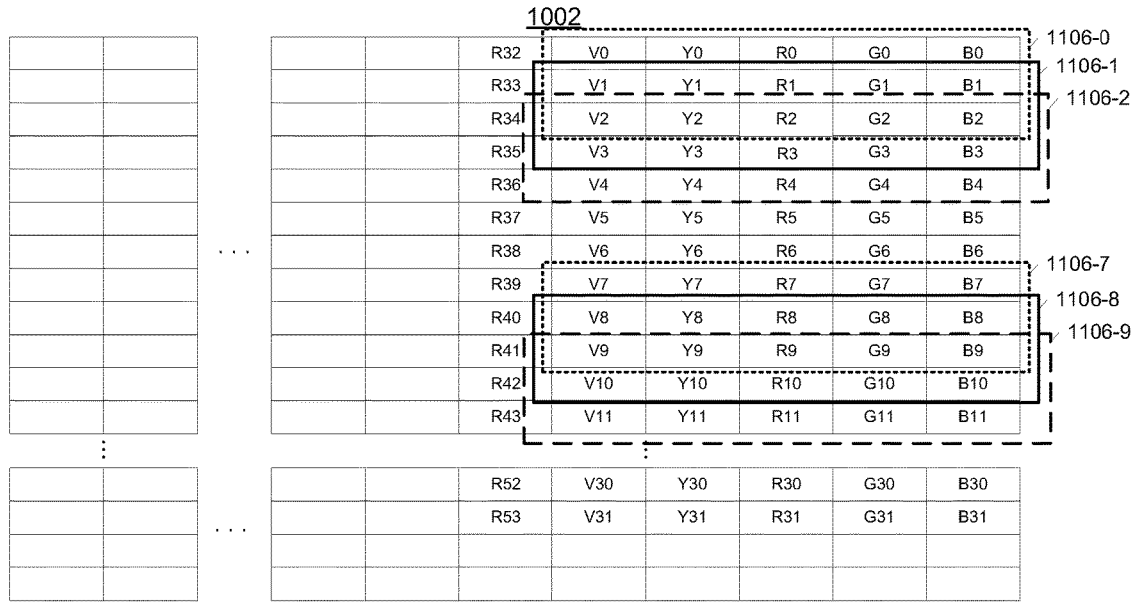
FIGS. 11a and 11b illustrate operational aspects of the register array and compute block shown in FIG. 10
Figure 11A:
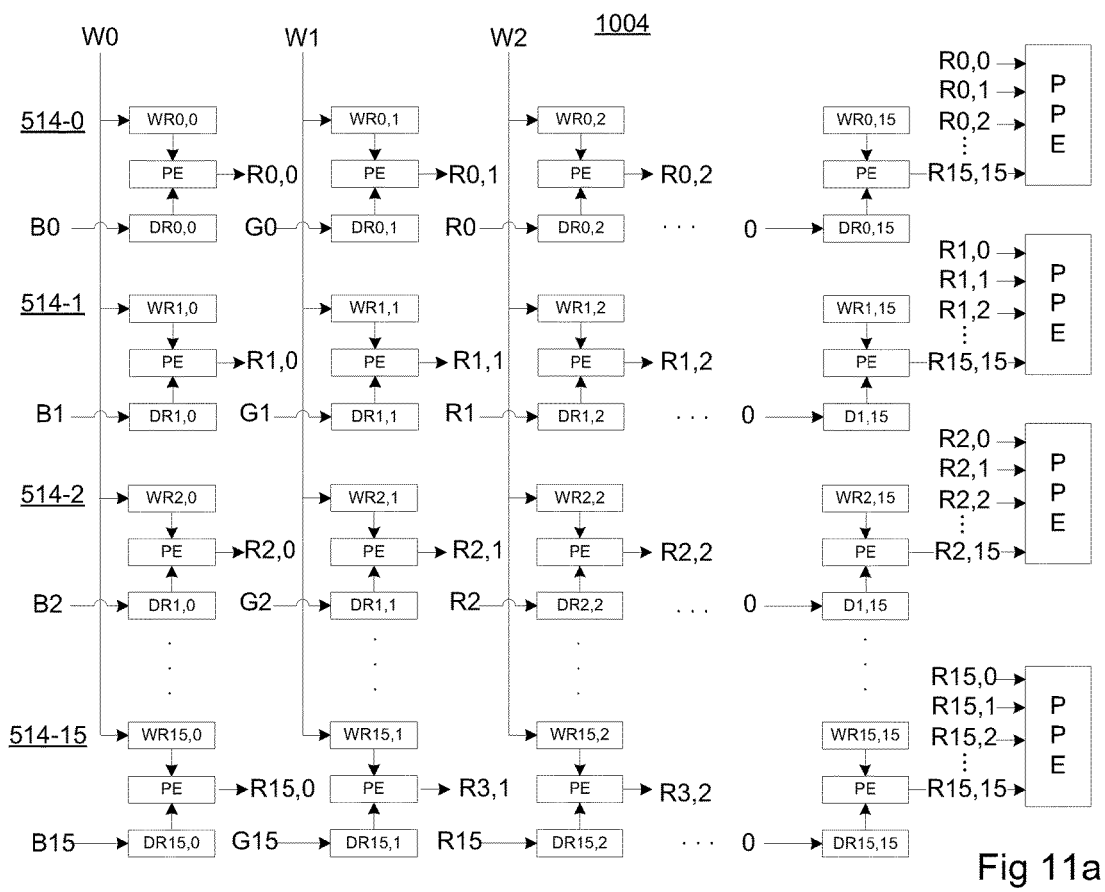
Figure 11B:
Figure 11B:
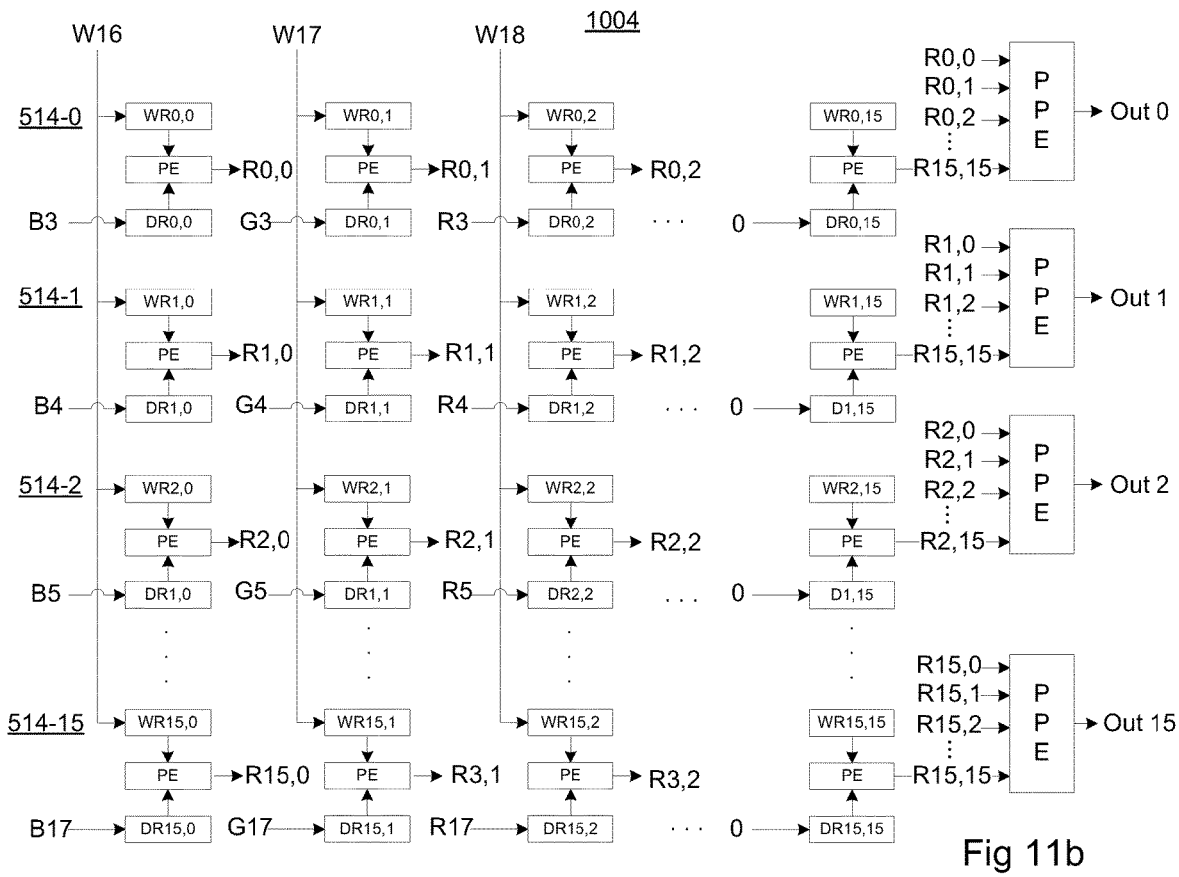

FIG. 10 illustrates an example of a dot product between a 3×3 kernel and 3×3 data block. Pipe block 1004 is capable of implementing a dot product between a 4×4 kernel and 4×4 data block each cycle. Pipe block 1004 is incapable of implementing a dot product between 5×5 kernel and a 5×5 data block in a single cycle. However, pipe block 1004 can implement a dot product between a 5×5 kernel and a 5×5 data block in two cycles. FIGS. 11a and 11b illustrate a configuration for implementing a dot product between a 5×5 kernel and a 5×5 data block in consecutive cycles, respectively.

In FIG. 11a, array-rate control circuit 512 is configured to select 15 sub arrays with height=3 and width=5. FIG. 11a shows several sub arrays (1106-0-1106-2 and 1106-7-1106-9)), but not all the sub arrays selected by array-rate control circuit 512 based upon the 3×5 read pattern. Pipe loader circuit 506 loads data from the selected sub arrays into DR registers of pipes 514-0-514-15, respectively. FIG. 11a shows data loading into DR registers of the data processing circuits. It is noted the last DR registers (i.e., DR-0,15-DR15,15) in each pipe 514 is loaded with 0. After the pipe loader circuit 506 loads data registers DR, each of the processing elements PE multiply the contents of its corresponding DR and WR registers. Pipe processing element PPE in each pipe 514 receives the results R from the processing elements PE. Thereafter, each PPE processes (e.g., adds) the inputs to produce a partial dot product DP1, which is temporarily stored in local memory of the PPE. Thereafter, array-read control circuit 512 is configured to select 10 sub arrays with height=2 and width=5. FIG. 11b shows several (1108-0-1108-2 and 1108-7-1108-9)), but not all of the sub arrays selected by array-rate control circuit 512 based upon the 2×5 read pattern. Pipe loader circuit 506 loads data from the selected sub arrays into DR registers of pipes 514-0-514-15, respectively. FIG. 11b shows some of the data going into DR registers of the data processing circuits. It is noted the last 5 DR registers in each pipe 514 are loaded with 0. The WR registers may be loaded with new weights. After the pipe loader circuit 506 loads data registers DR, each of the processing elements PE multiply the contents of its corresponding DR and WR registers. Pipe processing element PPE in each pipe 514 receives the results from the processing elements PE. Thereafter, each PPE processes (e.g., adds) the inputs to produce another partial dot product DP2, which is then added to locally stored partial dot product DP2 to produce Out.

A neural network accelerator is disclosed. In one embodiment the accelerator includes a two dimensional array of registers, wherein each of the registers is configured to store data, and a compute block comprising a plurality of data processing pipeline circuits, each comprising a plurality of processing devices, wherein each of the processing devices comprises first and second storage elements, and wherein each of the processing devices is configured to process data in its first and second storage elements to produce an output. A first circuit can select first sub arrays of the array, wherein each of the first sub arrays includes RH rows of registers and RW columns of registers, wherein RH and RW are integers. A first load circuit can load data from registers of the selected first sub arrays into respective first storage elements of the compute block. The first load circuit can also be configured to load data from registers of each of the selected first sub arrays into respective first storage elements of a respective data processing pipeline circuit of the compute block. The pairs of the selected first sub arrays may include common registers of the array. The first load circuit can simultaneously load data from the registers of the selected first sub arrays into first storage elements of respective data processing pipeline circuits of the compute block. The accelerator may also include a second circuit configured to load second storage elements in the compute block with neural network weights. The data processing pipeline circuits in the compute block can be loaded with a same set of neural network weights. Each of the data processing pipeline circuits may further include a row of circuits, each configured for adding the outputs of the processing devices within the data processing pipeline circuit. The accelerator of this embodiment may further include a circuit configured to receive data from memory via a data bus, a second circuit for selecting a sub array of the array, wherein the sub array comprises LH rows of registers and LW columns of registers, wherein LH and RH are integers, and a second load circuit for loading data received from the memory into registers of the sub array. A second register may be included for storing a second value that determines LH. The second load circuit can load the registers of the sub array while the first load circuit loads data from the registers of the first sub arrays into first storage elements of respective data processing pipeline circuits of the compute block. The registers of the second sub array can be distinct from the registers of the first sub arrays. The first circuit can select second sub arrays of the array, wherein each of the second sub arrays comprises RH rows of registers and RW columns of registers; wherein the first load circuit is configured for loading data from registers of the second sub arrays into the first storage elements of respective data processing pipeline circuits of the compute block; wherein each of the first sub arrays is distinct from each of the second sub arrays. The second circuit can simultaneously load data received from the memory bus into the registers of the sub array.

In another embodiment, the accelerator includes a first circuit for selecting a sub array of an array of registers, wherein the sub array comprises LH rows of registers and LW columns of registers, wherein LH and RH are integers. In this embodiment the accelerator includes a register for storing a value that determines LH, and a first load circuit for loading data received from the memory bus into registers of the sub array. The accelerator may further include a compute block having a plurality of data processing pipeline circuits each comprising a plurality of processing devices, wherein each of the processing devices comprises first and second storage elements, and wherein each of the processing devices is configured to process data in the first and second storage elements to produce an output. A second circuit is also included for selecting first sub arrays of the array, wherein each of the first sub arrays comprises RH rows of registers and RW columns of registers, wherein RH and RW are integers. A register may be included for storing a value that determines the RH, and a second load circuit for loading data from registers of the first sub arrays into first storage elements of respective data processing pipeline circuits of the compute block. The second load circuit can simultaneously load data from the registers of the first sub arrays into first storage elements of respective data processing pipeline circuits of the compute block. The accelerator of this embodiment may also include another circuit configured to load second storage elements in the compute block with neural network weights. The data processing pipeline circuits in the compute block can be loaded with a same set of neural network weights.

A method is also disclosed for implementing neural network operations. The method may include the acts of selecting sub arrays of registers within an array of registers, wherein each of the first sub arrays comprises RH rows of registers and RW columns of registers, wherein RH and RW are integers, wherein the selected sub arrays are overlapping. In addition the method may include the act of loading data from registers of the selected sub arrays into respective first storage elements of data processing devices. The data processing devices process the data in their respective first storage elements. The method may further include receiving data from memory, selecting a first sub array of the array, wherein first the sub array comprises LH rows of registers and LW columns of registers, wherein LH and RH are integers, and wherein LH and RH are distinct from each other. And the method may include loading the data received from the memory into registers of the first sub array as data from registers of the selected sub arrays are loaded into the respective first storage elements of the data processing devices.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
   a two dimensional array of registers, wherein each of the registers is configured to store data;
   a compute block comprising a plurality of data processing pipeline circuits, each comprising a plurality of processing devices, wherein each of the processing devices comprises first and second storage elements, and wherein each of the processing devices is configured to process data in its first and second storage elements to produce an output;
   a first circuit for selecting read sub arrays of the array, wherein each of the read sub arrays comprises RH rows of registers and RW columns of registers, wherein RH and RW are integers; and
   a first load circuit for loading data from registers of the selected read sub arrays into respective first storage elements of the compute block.

2. The apparatus of claim 1 wherein the first load circuit is configured to load data from registers of each of the selected read sub arrays into respective first storage elements of a respective data processing pipeline circuit of the compute block.

3. The apparatus of claim 1 wherein pairs of the selected read sub arrays comprise common registers of the array.

4. The apparatus of claim 1 wherein the first load circuit simultaneously loads data from the registers of the selected read sub arrays into first storage elements of respective data processing pipeline circuits of the compute block.

5. The apparatus of claim 1 further comprising a second circuit configured to load second storage elements in the compute block with neural network weights.

6. The apparatus of claim 5 wherein data processing pipeline circuits in the compute block are loaded with a same set of neural network weights.

7. The apparatus of claim 1 wherein each of the data processing pipeline circuits further comprises a row of circuits, each configured for adding the outputs of the processing devices within the data processing pipeline circuit.

8. The apparatus of claim 1 further comprising:
a circuit configured to receive data from the memory via a data bus;
a second circuit for selecting a load sub array of the array, wherein the load sub array comprises LH rows of registers and LW columns of registers, wherein LH and LW are integers, wherein RH and LH are distinct from each other;
a second load circuit for loading data received from the memory into registers of the selected load sub array.

9. The apparatus of claim 8 further comprising: a first register for storing a first value that determines RH, and a second register for storing a second value that determines LH.

10. The apparatus of claim 8 wherein the second load circuit loads the registers of the selected load sub array while the first load circuit loads data from the registers of the read sub arrays into first storage elements of respective data processing pipeline circuits of the compute block.

11. The apparatus of claim 8 wherein the registers of the load sub array are distinct from the registers of the read sub arrays.

12. The apparatus of claim 11:
wherein the first circuit is configured for selecting second read sub arrays of the array, wherein each of the second read sub arrays comprises RH rows of registers and RW columns of registers;
wherein the first load circuit is configured for loading data from registers of the second read sub arrays into the first storage elements of respective data processing pipeline circuits of the compute block;
wherein each of the read sub arrays is distinct from each of the second read sub arrays.

13. The apparatus of claim 11 wherein the second circuit is configured to simultaneously load data received from the memory bus into the registers of the load sub array.

14. An integrated circuit comprising:
an array of registers, wherein each of the registers is configured to store data;
a first circuit for selecting a load sub array of the array of registers, wherein the load sub array comprises LH rows of registers and LW columns of registers, wherein LH and LW are integers;
a register for storing a value that determines LH;
a first load circuit for loading data received from a memory bus into registers of the load sub array;
a compute block comprising a plurality of data processing pipeline circuits each comprising a plurality of processing devices, wherein each of the processing devices comprises first and second storage elements, and wherein each of the processing devices is configured to process data in the first and second storage elements to produce an output;
a second circuit for selecting read sub arrays of the array of registers, wherein each of the read sub arrays comprises RH rows of registers and RW columns of registers, wherein RH and RW are integers;
a register for storing a value that determines the RH, wherein LH and RH are distinct from each other;
a second load circuit for loading data from registers of the read sub arrays into first storage elements of respective data processing pipeline circuits of the compute block.

15. The integrated circuit of claim 14 wherein the second load circuit simultaneously loads data from the registers of the read sub arrays into first storage elements of respective data processing pipeline circuits of the compute block.

16. The integrated circuit of claim 14 further comprising another circuit configured to load second storage elements in the compute block with neural network weights.

17. The integrated circuit of claim 16 wherein data processing pipeline circuits in the compute block are loaded with a same set of neural network weights.

18. A method comprising:
receiving data from memory;
selecting a load sub array of an array of registers, wherein the load sub array comprises LH rows of registers and LW columns of registers, wherein LH and LW are integers that are selected for implementing the type of neural network layer;
loading the data received from the memory into registers of the load sub array;
selecting read sub arrays of registers within the array of registers, wherein each of the read sub arrays comprises RH rows of registers and RW columns of registers, wherein RH and RW are integers that are selected for implementing a type of neural network layer, wherein the selected read sub arrays are overlapping, and wherein LH and RH are distinct from each other;
loading data from registers of the selected read sub arrays into respective first storage elements of data processing devices; and
the data processing devices processing the data in their respective first storage elements.

19. The method of claim 18 wherein:
the data received from the memory is loaded into registers of the load sub array as data from registers of the selected read sub arrays are loaded into the respective first storage elements of the data processing devices.

* * * * *